(12) United States Patent
Liu et al.

(10) Patent No.: US 10,938,441 B2
(45) Date of Patent: *Mar. 2, 2021

(54) NARROWBAND FREQUENCY HOPPING MECHANISMS TO OVERCOME BANDWIDTH RESTRICTIONS IN THE UNLICENSED FREQUENCY SPECTRUM

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,180

(22) Filed: Jun. 24, 2020

(65) Prior Publication Data

US 2020/0328777 A1    Oct. 15, 2020

Related U.S. Application Data

(63) Continuation of application No. 16/128,154, filed on Sep. 11, 2018, now Pat. No. 10,707,915.

(Continued)

(51) Int. Cl.
*H04B 1/7143* (2011.01)
*H04L 5/00* (2006.01)
(Continued)

(52) U.S. Cl.
CPC .......... *H04B 1/7143* (2013.01); *H04B 1/713* (2013.01); *H04B 1/7136* (2013.01);
(Continued)

(58) Field of Classification Search
CPC .... H04B 1/7143; H04B 1/713; H04B 1/7136; H04B 2001/71362; H04B 2001/71365;
(Continued)

(56) References Cited

U.S. PATENT DOCUMENTS 8,711,785 B2 *  4/2014  Gholmieh ............. H04L 5/0091
                                                    370/329
9,154,272 B2 * 10/2015  Gaal ..................... H04L 5/0007
(Continued)

FOREIGN PATENT DOCUMENTS

WO       2018231918 A1    12/2018

OTHER PUBLICATIONS

International Search Report and Written Opinion—PCT/US2018/058920—ISA/EPO—dated Feb. 14, 2019.

(Continued)

*Primary Examiner* — James M Perez
(74) *Attorney, Agent, or Firm* — Arent Fox LLP

(57) ABSTRACT

In an aspect of the disclosure, a method, a computer-readable medium, and an apparatus are provided. In one example, the apparatus may be a base station. In certain configurations, the apparatus may transmit information indicating a narrowband frequency hopping pattern to at least one UE. In certain aspects, the narrowband frequency hopping pattern may correspond to a plurality of frames. In certain other aspects, the plurality of frames may include at least one non-anchor channel and being associated with a plurality of anchor channels. The apparatus may communicate with the at least one UE using the narrowband frequency hopping pattern, including concurrently transmitting a discovery reference signal (DRS) in each of the plurality of anchor channels at a start of each hopping frame. In certain aspects, communication on the plurality of anchor channels may occur during the same frames.

30 Claims, 16 Drawing Sheets

Related U.S. Application Data

(60) Provisional application No. 62/594,470, filed on Dec. 4, 2017.

(51) Int. Cl.
| | | |
|---|---|---|
| *H04B 1/7136* | (2011.01) | |
| *H04W 16/14* | (2009.01) | |
| *H04B 1/713* | (2011.01) | |
| *H04W 48/16* | (2009.01) | |
| *H04L 27/26* | (2006.01) | |

(52) U.S. Cl.
CPC .......... *H04L 5/0048* (2013.01); *H04L 5/0098* (2013.01); *H04W 16/14* (2013.01); *H04B 2001/71362* (2013.01); *H04B 2001/71365* (2013.01); *H04L 5/001* (2013.01); *H04L 5/005* (2013.01); *H04L 5/0012* (2013.01); *H04L 5/0023* (2013.01); *H04L 5/0094* (2013.01); *H04L 27/26* (2013.01); *H04W 48/16* (2013.01)

(58) Field of Classification Search
CPC ...... H04W 16/14; H04W 48/16; H04L 5/001; H04L 5/0048; H04L 5/0012; H04L 5/005; H04L 5/0023; H04L 5/0094; H04L 5/0098; H04L 27/26

See application file for complete search history.

(56) References Cited

U.S. PATENT DOCUMENTS

| | | | |
|---|---|---|---|
| 9,961,684 B2* | 5/2018 | Luo | H04L 5/0041 |
| 10,045,345 B2* | 8/2018 | Ma | H04W 72/0453 |
| 10,244,518 B2* | 3/2019 | Chen | H04W 72/042 |
| 10,264,579 B2* | 4/2019 | Zhang | H04L 5/0037 |
| 10,298,289 B2* | 5/2019 | Yerramalli | H04L 5/0007 |
| 10,448,421 B2* | 10/2019 | Bhattad | H04W 72/1294 |
| 10,454,657 B2* | 10/2019 | Bhattad | H04L 5/0005 |
| 10,454,658 B2* | 10/2019 | Bhattad | H04L 5/0092 |
| 10,454,659 B2* | 10/2019 | Bhattad | H04L 5/1469 |
| 10,484,959 B2* | 11/2019 | Liu | H04B 1/7143 |
| 10,491,343 B2* | 11/2019 | Rico Alvarino | H04L 5/0053 |
| 10,511,987 B2* | 12/2019 | Liu | H04W 24/10 |
| 10,531,459 B2* | 1/2020 | Yerramalli | H04L 27/2634 |
| 10,542,491 B2* | 1/2020 | Bhattad | H04L 5/0053 |
| 10,547,421 B2* | 1/2020 | Palanivelu | H04W 64/00 |
| 10,652,854 B2* | 5/2020 | Liu | H04W 52/0216 |
| 10,707,915 B2* | 7/2020 | Liu | H04B 1/713 |
| 10,715,210 B1* | 7/2020 | Liu | H04B 1/7143 |
| 10,784,999 B2* | 9/2020 | Liu | H04L 5/0039 |
| 10,798,602 B2* | 10/2020 | Yerramalli | H04B 1/713 |
| 2014/0341091 A1* | 11/2014 | Ji | H04L 5/1469 370/280 |
| 2015/0139006 A1* | 5/2015 | Seo | H04J 11/005 370/252 |
| 2015/0373731 A1* | 12/2015 | Quan | H04W 72/082 370/329 |
| 2016/0057693 A1* | 2/2016 | Nagata | H04W 8/005 370/254 |
| 2016/0127936 A1* | 5/2016 | Chatterjee | H04W 4/70 370/252 |
| 2016/0135124 A1* | 5/2016 | Vos | H04W 52/0216 370/311 |
| 2016/0205692 A1* | 7/2016 | Zhang | H04W 48/12 370/329 |
| 2016/0234707 A1* | 8/2016 | Kazmi | H04W 24/08 |
| 2016/0301503 A1* | 10/2016 | Rico Alvarino | H04W 76/28 |
| 2016/0316374 A1* | 10/2016 | Xu | H04W 4/70 |
| 2016/0338086 A1* | 11/2016 | Zhou | H04W 72/1252 |
| 2017/0094621 A1* | 3/2017 | Xu | H04L 47/125 |
| 2017/0208592 A1* | 7/2017 | Rico Alvarino | H04L 5/0048 |
| 2017/0230915 A1* | 8/2017 | Kim | H04W 52/34 |
| 2017/0294939 A1* | 10/2017 | Wang | H04W 72/0453 |
| 2017/0311276 A1* | 10/2017 | Tsai | H04L 27/2602 |
| 2017/0331670 A1* | 11/2017 | Parkvall | H04W 52/0274 |
| 2018/0020360 A1* | 1/2018 | Yerramalli | H04L 5/001 |
| 2018/0020452 A1* | 1/2018 | Yerramalli | H04W 56/0015 |
| 2018/0063841 A1* | 3/2018 | Song | H04W 72/042 |
| 2018/0176919 A1* | 6/2018 | Takahashi | H04W 72/0453 |
| 2018/0213468 A1* | 7/2018 | Chatterjee | H04W 48/10 |
| 2018/0287840 A1* | 10/2018 | Akkarakaran | H04L 27/2692 |
| 2018/0287846 A1* | 10/2018 | Kim | H04L 27/2666 |
| 2018/0309479 A1* | 10/2018 | Yerramalli | H04L 5/0012 |
| 2018/0310341 A1* | 10/2018 | Yerramalli | H04W 74/004 |
| 2018/0317198 A1* | 11/2018 | Lee | H04W 68/005 |
| 2018/0352590 A1* | 12/2018 | Sha | H04W 72/0453 |
| 2018/0376484 A1* | 12/2018 | Beale | H04L 5/0053 |
| 2019/0007174 A1* | 1/2019 | Takeda | H04W 72/04 |
| 2019/0007946 A1* | 1/2019 | Yerramalli | H04W 16/14 |
| 2019/0007958 A1* | 1/2019 | Zhang | H04L 5/0005 |
| 2019/0020424 A1* | 1/2019 | Yerramalli | H04B 1/713 |
| 2019/0021081 A1* | 1/2019 | Ljung | H04W 72/0453 |
| 2019/0028143 A1* | 1/2019 | Zhang | H04W 72/042 |
| 2019/0028247 A1* | 1/2019 | Liu | H04W 4/70 |
| 2019/0037427 A1* | 1/2019 | Yerramalli | H04W 24/10 |
| 2019/0037525 A1* | 1/2019 | Liu | H04L 5/0094 |
| 2019/0044598 A1* | 2/2019 | Talarico | H04L 27/0006 |
| 2019/0045372 A1* | 2/2019 | Niu | H04W 16/14 |
| 2019/0045553 A1* | 2/2019 | Zhang | H04L 5/0048 |
| 2019/0045559 A1* | 2/2019 | Huang | H04W 24/10 |
| 2019/0068261 A1* | 2/2019 | Priyanto | H04L 1/189 |
| 2019/0069150 A1* | 2/2019 | Blankenship | H04W 4/70 |
| 2019/0069228 A1* | 2/2019 | Malik | H04L 5/005 |
| 2019/0075602 A1* | 3/2019 | Lin | H04L 5/0012 |
| 2019/0089570 A1* | 3/2019 | Li | H04W 56/001 |
| 2019/0090149 A1* | 3/2019 | Liu | H04W 4/70 |
| 2019/0104549 A1* | 4/2019 | Deng | H04B 7/0617 |
| 2019/0132817 A1* | 5/2019 | Liu | H04L 5/0044 |
| 2019/0149190 A1* | 5/2019 | Liu | H04L 5/0012 375/132 |
| 2019/0162817 A1* | 5/2019 | Priyanto | G01S 5/04 |
| 2019/0173521 A1* | 6/2019 | Liu | H04B 1/7136 |
| 2019/0173611 A1* | 6/2019 | Liu | H04W 4/70 |
| 2019/0174283 A1* | 6/2019 | Awad | H04L 5/0092 |
| 2019/0174454 A1* | 6/2019 | Priyanto | G01S 1/20 |
| 2019/0174476 A1* | 6/2019 | Chang | H04W 56/001 |
| 2019/0174510 A1* | 6/2019 | Shin | H04W 72/042 |
| 2019/0181995 A1* | 6/2019 | Liu | H04W 48/10 |
| 2019/0182021 A1* | 6/2019 | Shokri Razaghi | H04L 67/10 |
| 2019/0182823 A1* | 6/2019 | Awad | H04W 72/0413 |
| 2019/0191457 A1* | 6/2019 | Si | H04W 48/12 |
| 2019/0238219 A1* | 8/2019 | Liu | H04W 72/042 |
| 2019/0246254 A1* | 8/2019 | Chatterjee | H04L 5/0053 |
| 2019/0281523 A1* | 9/2019 | Lee | H04W 48/18 |
| 2019/0281587 A1* | 9/2019 | Zhang | H04L 5/0044 |
| 2019/0327047 A1* | 10/2019 | Liu | H04L 5/0048 |
| 2019/0349734 A1* | 11/2019 | Sui | H04L 5/0062 |
| 2019/0387532 A1* | 12/2019 | Liu | H04W 48/12 |
| 2020/0029314 A1* | 1/2020 | Niu | H04L 5/0044 |
| 2020/0053516 A1* | 2/2020 | Sui | H04W 4/08 |
| 2020/0053800 A1* | 2/2020 | Deng | H04L 5/0048 |
| 2020/0169955 A1* | 5/2020 | Chang | H04W 4/70 |
| 2020/0220673 A1* | 7/2020 | Chang | H04W 16/14 |
| 2020/0328777 A1* | 10/2020 | Liu | H04B 1/713 |
| 2020/0336973 A1* | 10/2020 | Niu | H04B 1/7156 |

OTHER PUBLICATIONS

Qualcomm Europe: "Notion of Anchor Carver in LTE-A", 3GPP Draft; R1-092061, 3rd Generation Partnership Project (3GPP), Mobile Competence Center, 650, Route Des Lucioles, F-06921 Sophia-Antipolis, Cedex, France, No. San Francisco, USA, Apr. 28, 2009, Apr. 28, 2009, (Apr. 28, 2009), XP050339519, pp. 1-5.

* cited by examiner

NARROWBAND FREQUENCY HOPPING MECHANISMS TO OVERCOME BANDWIDTH RESTRICTIONS IN THE UNLICENSED FREQUENCY SPECTRUM

CROSS-REFERENCE TO RELATED APPLICATION(S)

This application is a Continuation of U.S. patent application Ser. No. 16/128,154, entitled "NARROWBAND FREQUENCY HOPPING MECHANISMS TO OVERCOME BANDWIDTH RESTRICTIONS IN THE UNLICENSED FREQUENCY SPECTRUM" and filed on Sep. 11, 2018, which claims the benefit of U.S. Provisional Application Ser. No. 62/594,470, entitled "NARROWBAND FREQUENCY HOPPING MECHANISMS TO OVERCOME BANDWIDTH RESTRICTIONS IN THE UNLICENSED FREQUENCY SPECTRUM" and filed on Dec. 4, 2017, which are expressly incorporated by reference herein in their entirety.

BACKGROUND

Technical Field

The present disclosure relates generally to communication systems, and more particularly, to mechanisms that overcome the bandwidth restrictions for narrowband communications using the unlicensed frequency spectrum.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings. However, supporting a six RB (e.g., 1.08 MHz) communication bandwidth and/or a single RB (e.g., 180 kHz) communication bandwidth operating in the unlicensed frequency spectrum may not always be possible.

Thus, there is a need for a mechanism that overcomes the bandwidth restrictions for narrowband communications using the unlicensed frequency spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. Another example of narrowband communication is eMTC, which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In certain eMTC configurations, the channel bandwidth for narrowband communications may be six RBs with various repetition levels to support low complexity devices and high efficiency power amplifiers (PA). In certain NB-IoT configurations, the channel bandwidth for narrowband communications may be restricted to a single tone (e.g., 3.75 kHz) to support low complexity devices and high efficiency PA.

However, supporting a six RB (e.g., 1.08 MHz) communication bandwidth and/or a single tone (e.g., 3.75 kHz, etc.) communication bandwidth may not be possible due to certain power spectral density (PSD) restrictions (e.g., transmission power restrictions) and bandwidth requirements for narrowband communications (e.g., eMTC and/or NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.).

For example, the PSD used for digital modulation (DTS) in the United States may be limited to a maximum of 8 dBm/3 kHz. Hence, a UE may not be able to transmit a single tone transmission using full power in the unlicensed spectrum because the maximum PSD is limited to a bandwidth (e.g., 3 kHz) that is smaller than a single tone (e.g., 3.75 kHz). Further, the system bandwidth for narrowband communications using the unlicensed frequency spectrum in the United States may be restricted to, e.g., 500 kHz. In other words, when using DTS mode, a base station may have to meet the minimum bandwidth requirement (e.g., 500 kHz)

and the PSD limit (e.g., 8 dBm/3 kHz) in order to be able to operate in the United States (and certain other countries).

Coverage enhancements, such as frequency hopping, for narrowband devices (e.g., UEs and/or base stations) may be employed to provide more reliable communications within a narrowband communication system, and to overcome the PSD restrictions and bandwidth requirements associated with DTS mode for narrowband communications using the unlicensed frequency spectrum.

For example, a UE and/or base station may perform frequency hopping in order to monitor, receive, and/or transmit signals by switching a carrier among different frequency channels (e.g., carrier aggregation) to exploit the frequency diversity of the unlicensed frequency spectrum.

In certain configurations, while operating in frequency hopping mode in the unlicensed frequency spectrum, a base station and/or UE may be constrained to a minimum number of frequency hopping channels (e.g., 50 channels) when the narrowband system bandwidth is less than a threshold criteria (e.g., less than 250 kHz). However, a base station and/or UE operating in frequency hopping mode may not be constrained to the minimum bandwidth requirement and/or PSD limit associated with DTS mode.

In certain other configurations, a base station may operate in hybrid mode in which the PSD limit of the DTS mode is still applicable, but without the minimum bandwidth constraint associated with the DTS mode, but without being constrained to the minimum number of frequency hopping channels associated with frequency hopping mode.

There is a need for technique(s) that facilitate narrowband communication within the unlicensed frequency spectrum that meet the various constraints associated with DTS mode, frequency hopping mode, and hybrid mode.

In an aspect of the disclosure, a method, a computer-readable medium, and an apparatus are provided. In one example, the apparatus may be a base station. In certain configurations, the apparatus may transmit information indicating a narrowband frequency hopping pattern to at least one UE. In certain aspects, the narrowband frequency hopping pattern may correspond to a plurality of frames. In certain other aspects, the plurality of frames may include at least one non-anchor channel and being associated with a plurality of anchor channels. The apparatus may communicate with the at least one UE using the narrowband frequency hopping pattern, including concurrently transmitting a discovery reference signal (DRS) in each of the plurality of anchor channels at a start of each hopping frame. In certain aspects, communication on the plurality of anchor channels may occur during the same frames. Each DRS may include at least a primary synchronization signal (PSS) and a secondary synchronization signal (SSS) for a respective anchor channel.

In another example, the apparatus may be a UE. In certain configurations, the apparatus may receive information indicating a narrowband frequency hopping pattern within from a base station. In certain aspects, the narrowband frequency hopping pattern may correspond to a plurality of frames. In certain aspects, the plurality of frames may include at least one non-anchor channel and may be associated with a plurality of anchor channels. The apparatus may communicate with the base station using the narrowband frequency hopping pattern including receiving concurrent transmissions of a discovery reference signal (DRS) in each of the plurality of anchor channels at a start of each hopping frame. Each DRS may include at least a PSS and an SSS for a respective anchor channel. In certain aspects, communication on the plurality of anchor channels may occur during the same frames.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
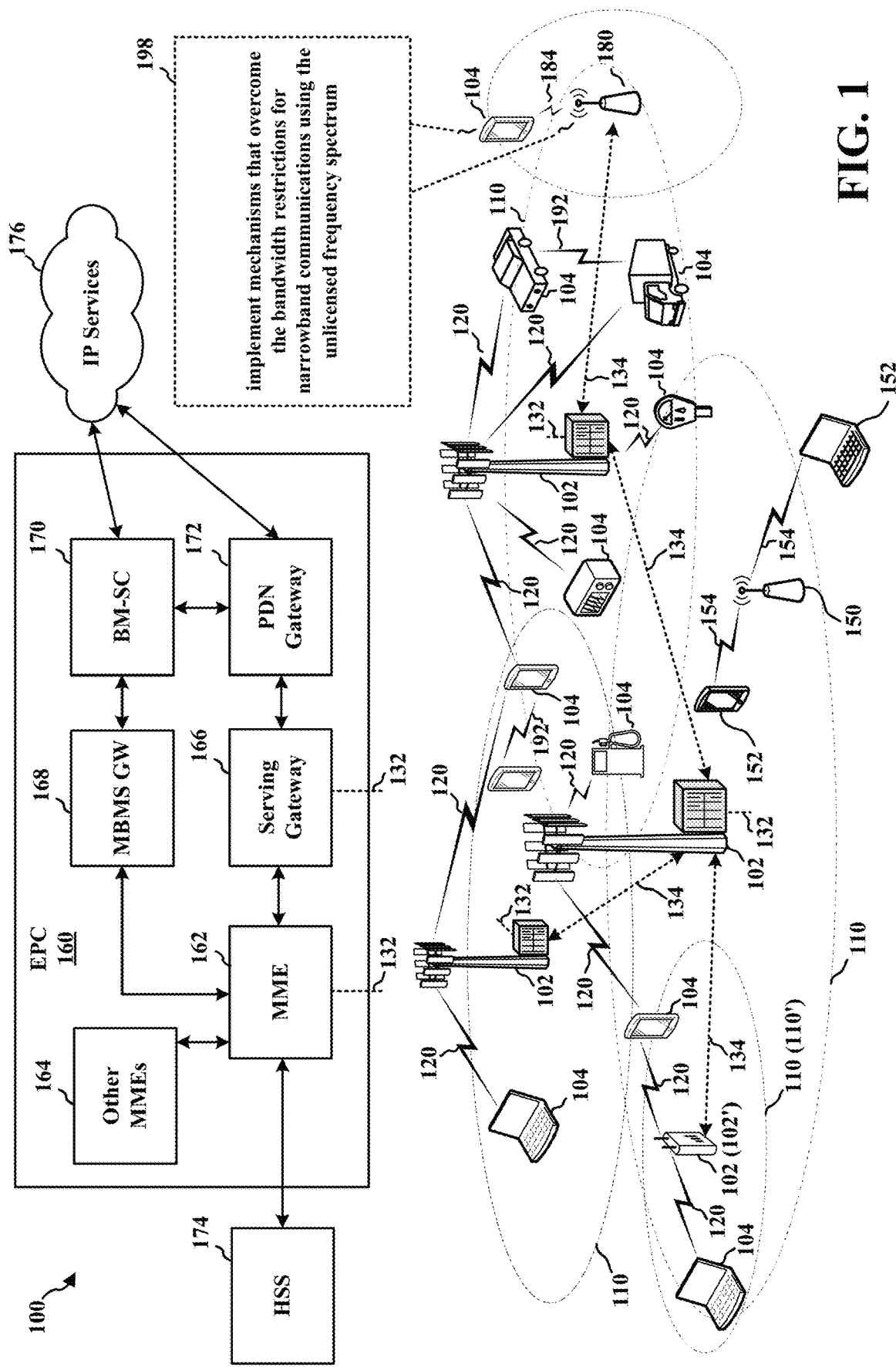
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or base station 180 may be configured to implement mechanisms that overcome the bandwidth restrictions for narrowband communications using the unlicensed frequency spectrum (198), e.g., as described below in connection with any of FIGS. 2A-11.

Figure 2A:
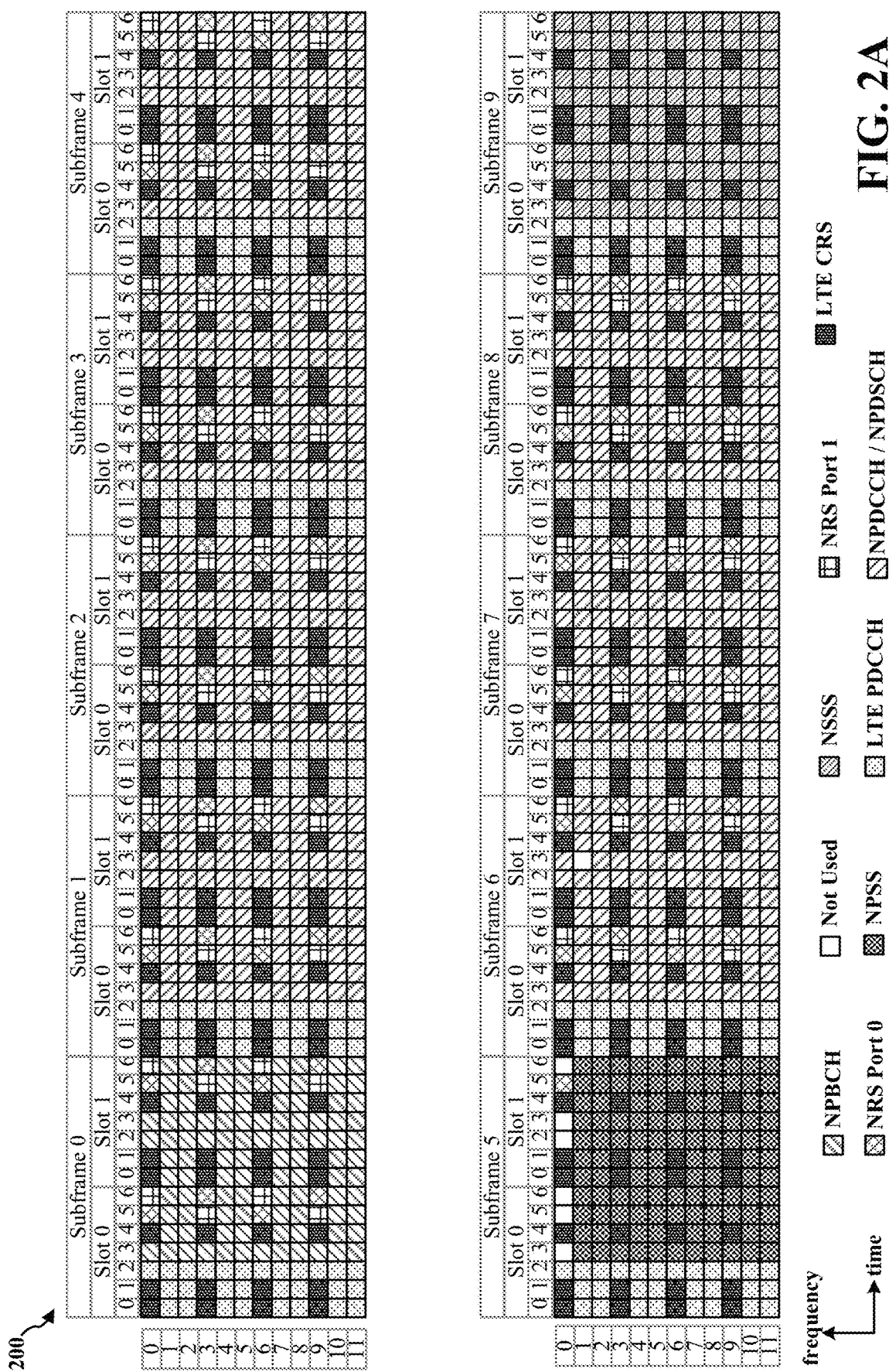
FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/stand-alone deployment inside an LTE carrier (even radio frame), and an NB frame structure for guard band/standalone deployment inside an LTE carrier (even radio frame), respectively.
Figure 2B:
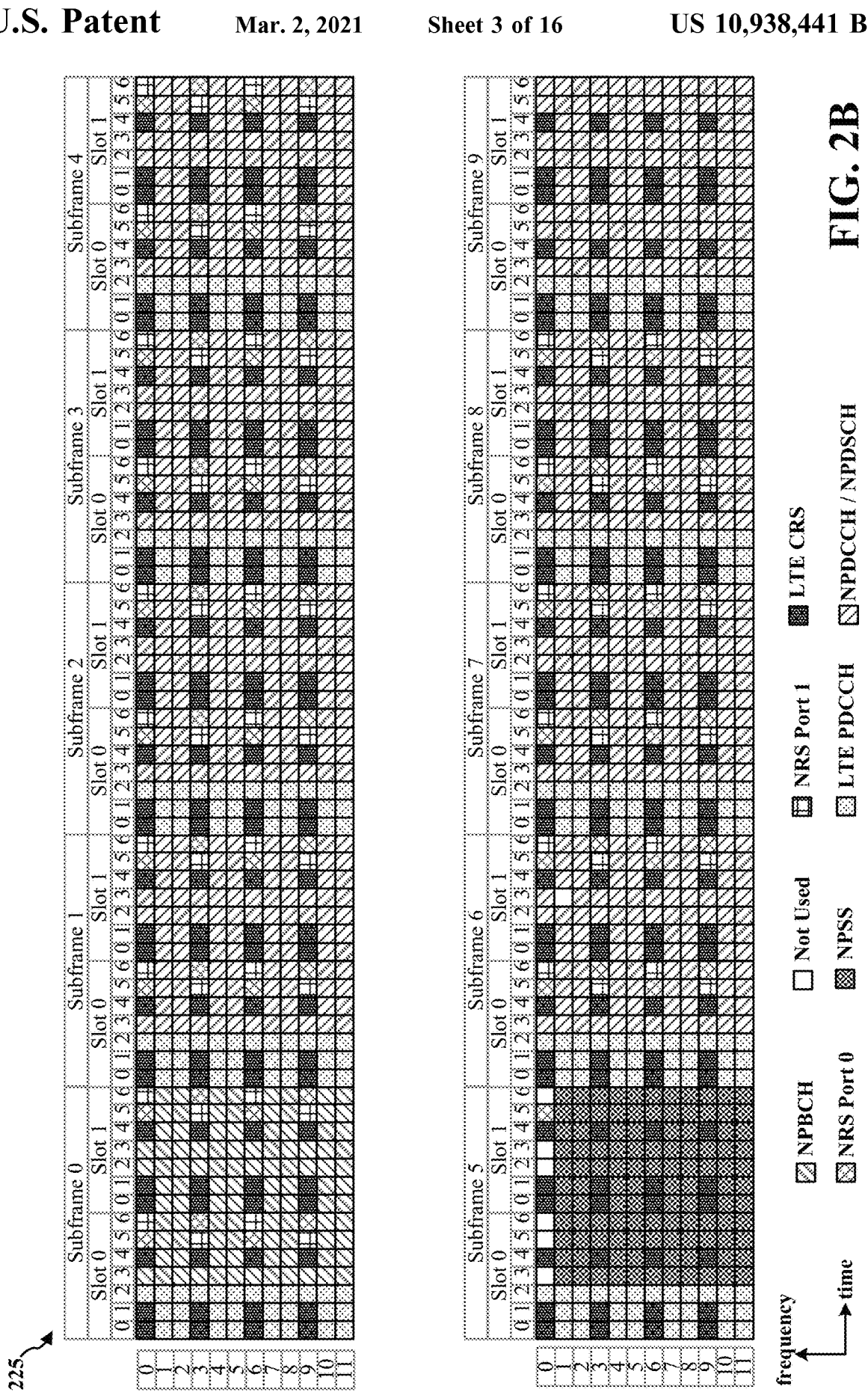
Figure 2C:
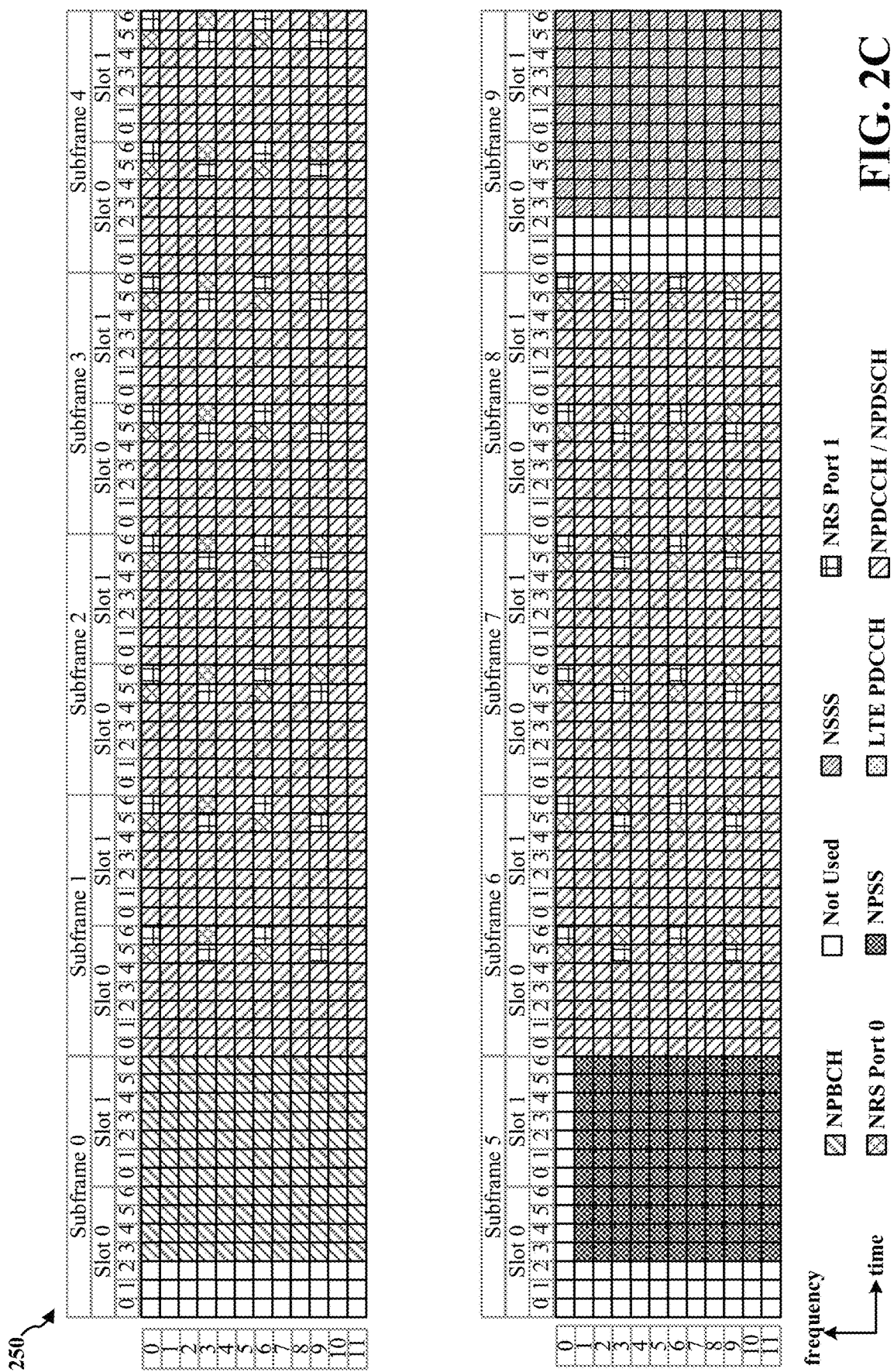
Figure 2D:
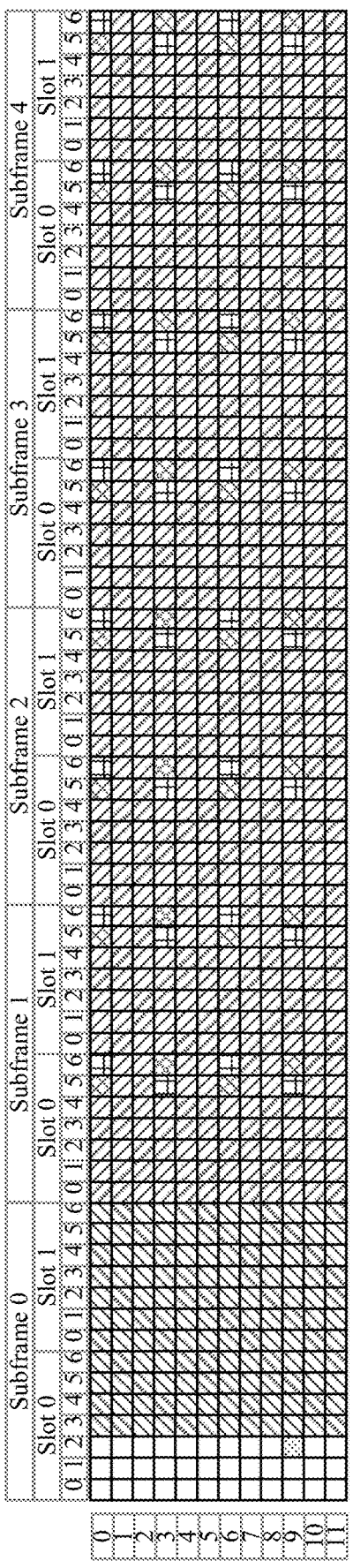
Figure 2D:
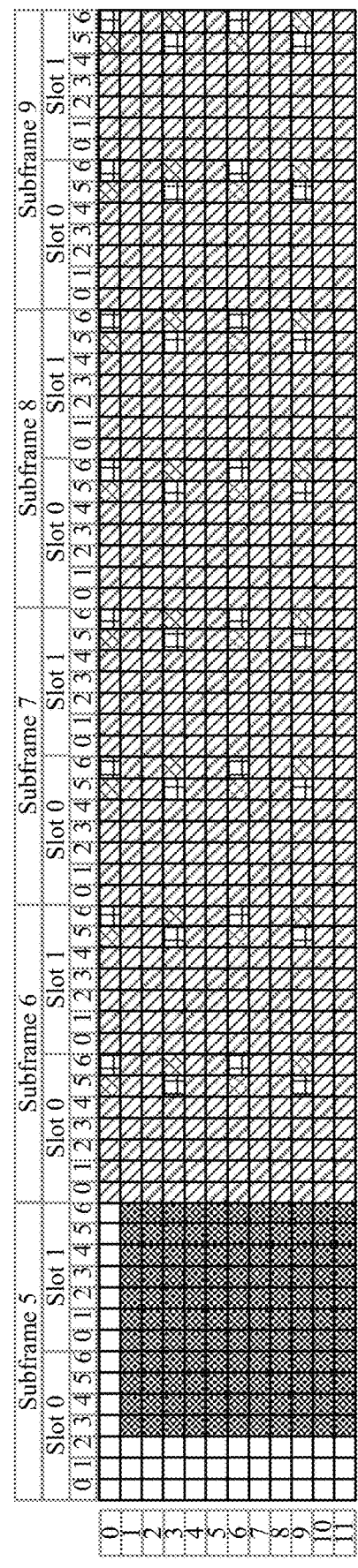

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB-IoT may utilize RBs within the global system for mobile communications (GSM) carriers.

As illustrated in FIGS. 2A-2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, a narrowband primary synchronization signal (NPSS) may be transmitted in subframe 5 of even and odd radio frames, and a narrowband secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The narrowband physical broadcasting channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

Figure 3:
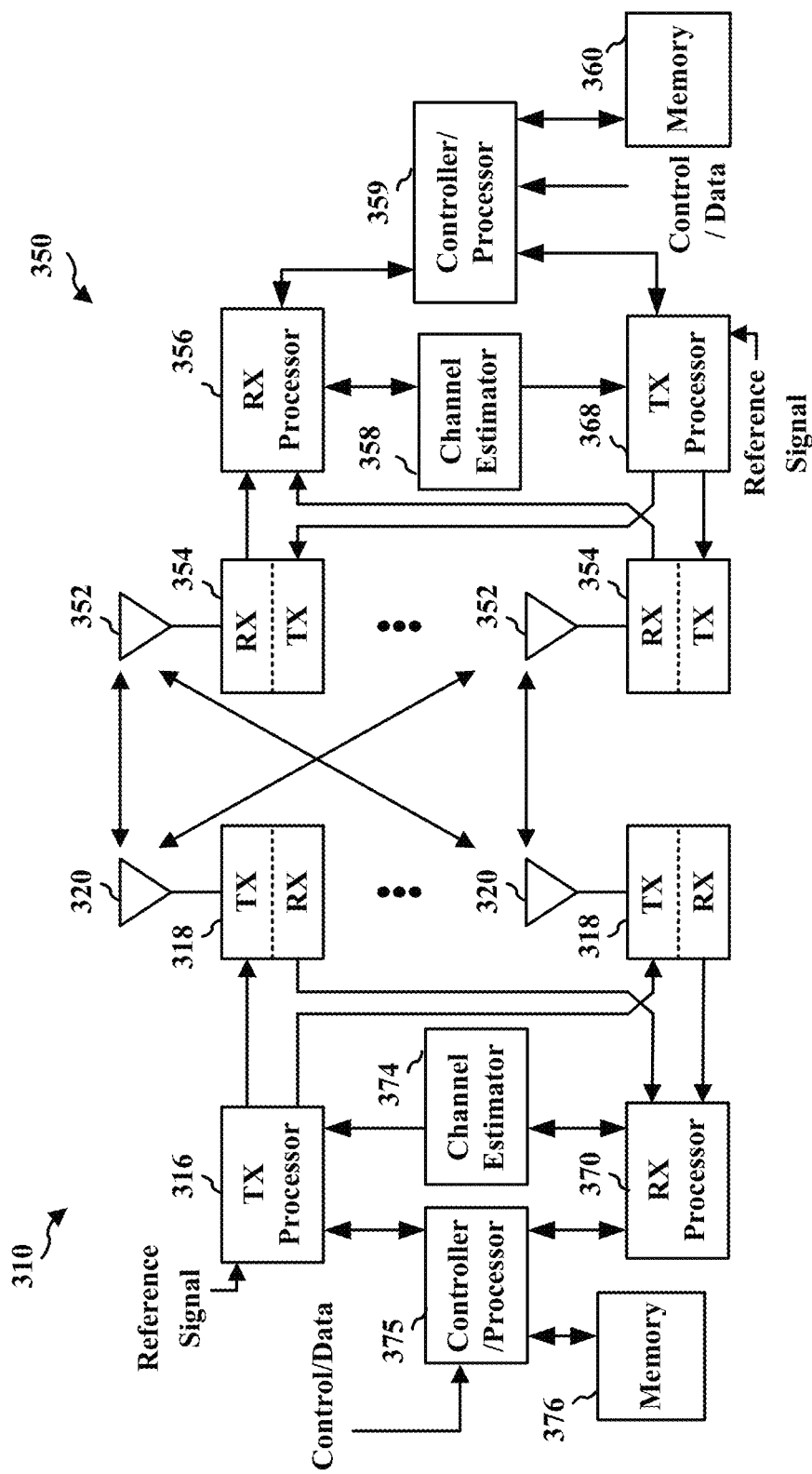
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is NB-IoT communication, which may be limited to a single RB of system bandwidth, e.g., 180 kHz. Another example of narrowband communication is eMTC, which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

In certain eMTC configurations, the channel bandwidth for narrowband communications may be six RBs with various repetition levels to support low complexity devices and high efficiency power amplifiers (PA). In certain NB-IoT configurations, the channel bandwidth for narrowband communications may be restricted to a single tone (e.g., 3.75 kHz) to support low complexity devices and high efficiency PA.

However, supporting a six RB (e.g., 1.08 MHz) communication bandwidth and/or a single tone (e.g., 3.75 kHz, etc.) communication bandwidth may not be possible due to certain power spectral density (PSD) restrictions (e.g., transmission power restrictions) and bandwidth requirements for narrowband communications (e.g., eMTC and/or NB-IoT) that use the unlicensed frequency spectrum (e.g., 5 GHz unlicensed frequency spectrum, the sub-2.4 GHz unlicensed frequency spectrum, or the sub-GHz unlicensed frequency spectrum, etc.).

For example, the PSD used for DTS in the United States may be limited to a maximum of 8 dBm/3 kHz. Hence, a UE may not be able to transmit a single tone transmission using full power in the unlicensed spectrum because the maximum PSD is limited to a bandwidth (e.g., 3 kHz) that is smaller than a single tone (e.g., 3.75 kHz). Further, the system bandwidth for narrowband communications using the unlicensed frequency spectrum in the United States may be restricted to, e.g., 500 kHz. In other words, when using DTS mode, a base station may have to meet the minimum bandwidth requirement (e.g., 500 kHz) and the PSD limit (e.g., 8 dBm/3 kHz) in order to be able to operate in the United States (and certain other countries).

Coverage enhancements, such as frequency hopping, for narrowband devices (e.g., UEs and/or base stations) may be employed to provide more reliable communications within a narrowband communication system, and to overcome the PSD restrictions and bandwidth requirements associated with DTS mode for narrowband communications using the unlicensed frequency spectrum.

For example, a UE and/or base station may perform frequency hopping in order to monitor, receive, and/or transmit signals by switching a carrier among different frequency channels (e.g., carrier aggregation) to exploit the frequency diversity of the unlicensed frequency spectrum.

In certain configurations, while operating in frequency hopping mode in the unlicensed frequency spectrum, a base station and/or UE may be constrained to a minimum number of frequency hopping channels (e.g., 50 channels) when the narrowband system bandwidth is less than a threshold criteria (e.g., less than 250 kHz). However, a base station and/or UE operating in frequency hopping mode may not be constrained to the minimum bandwidth requirement and/or PSD limit associated with DTS mode.

In certain other configurations, a base station may operate in hybrid mode in which the PSD limit of the DTS mode is still applicable, but without the minimum bandwidth constraint associated with the DTS mode, but without being constrained to the minimum number of frequency hopping channels associated with frequency hopping mode.

There is a need for technique(s) that facilitate narrowband communication within the unlicensed frequency spectrum that meet the various constraints associated with DTS mode (e.g., described below in connection with FIG. 4A), frequency hopping mode (e.g., described in connection with FIG. 4B), and hybrid mode (e.g., described below in connection with FIG. 4C).

Figure 4A:
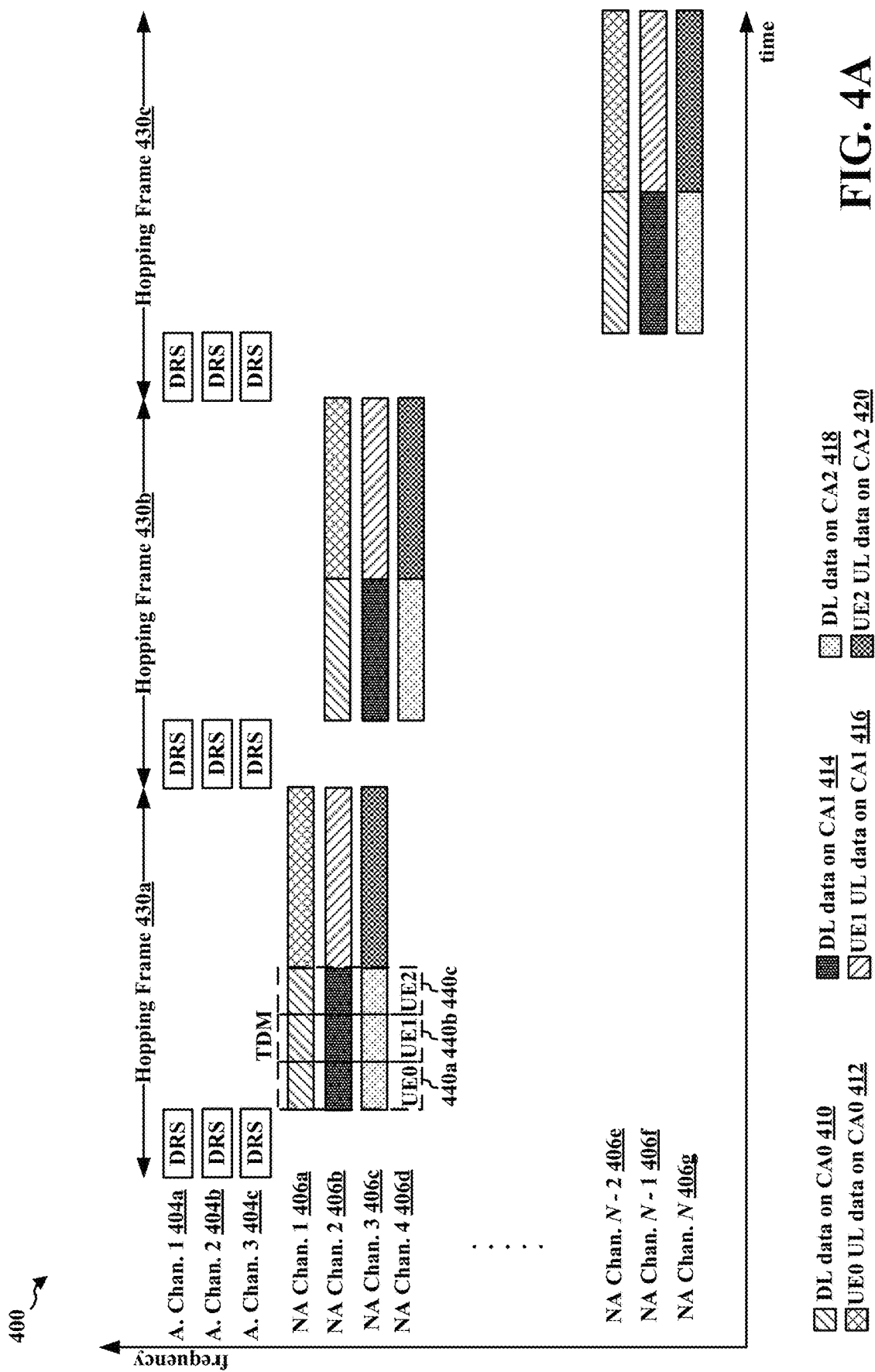
FIG. 4A illustrates a frequency hopping pattern that may be used for narrowband communications in the unlicensed frequency spectrum between a base station and a UE in accordance with certain aspects of the disclosure.

FIG. 4A illustrates a frequency hopping pattern 400 that may be used for narrowband communications in the unlicensed frequency spectrum between a base station and a UE in accordance with certain aspects of the disclosure. The frequency hopping pattern 400 illustrated in FIG. 4A may be used for narrowband communications between a base station (e.g., base station 102, 180, 502, 1050, eNB 301, the apparatus 702/702') operating in DTS mode and a UE (e.g., UE 104, 350, 504a, 504b, 750, the apparatus 1002/1002') operating in frequency hopping mode. Because the base station is operating in DTS mode in the unlicensed frequency spectrum, DL data sent from the base station may need to occupy at least a minimum bandwidth (e.g., 500 kHz) at the expense of scheduling flexibility, and due to the PSD limit (e.g., 8 dBm/3 kHz) associated with DTS mode, the DL data may be transmitted in at least 3 RB in order to transmit at the maximum TX power of 30 dBm. Because the UE is operating in frequency hopping mode in the unlicensed frequency spectrum, the UE may send UL data to the base station in N≥x (e.g., x=50) hopping frequencies that each have at least a minimum bandwidth (e.g., 180 kHz, 200 kHz, etc.).

A base station operating in DTS mode may use the frequency hopping pattern 400 illustrated in FIG. 4A to monitor, receive, and/or transmit signals by switching among different frequency channels (e.g., anchor channels 404a, 404b, 404c and non-anchor channels 406a, 406b, 406c, 406d, 406e, 406f, 406g) to exploit the frequency diversity of the unlicensed frequency spectrum.

At the start of each hopping frame 430a, 430b, 430c, the base station may concurrently transmit a discovery reference signal (DRS) (e.g., NPSS, NSSS, NPBCH, and SIB-BR etc.) in each of the plurality of anchor channels 404a, 404b, 404c to at least one UE. The NPSS and NSSS may be used by a UE for initial synchronization, cell acquisition, timing estimation, and/or frequency estimation. In certain configurations, the base station may transmit NPSS and NSSS in the first anchor channel 404a, NPBCH in the second anchor channel 404b, and SIB-BR in the third anchor channel 404c. In certain other configurations, NPSS, NSSS, PBCH, and SIB-BR may be transmitted in each of the anchor channels 404a, 404b, 404c.

Because the bandwidth of each anchor channel 404a, 404b, 404c may be limited to the bandwidth capability of the UE's receiver (e.g., 1 RB, 180 kHz, 200 kHz, etc.), the bandwidth requirement (e.g., 180 kHz) associated with DTS mode may be satisfied. Each of the non-anchor channels 406a, 406b, 406c, 406d, 406e, 406f, 406g may be used to communicate DL data and UL data. The UL data may be communicated by a UE operating in frequency hopping mode.

The anchor channels 404a, 404b, 404c may each be used to carry information that indicates the frequency hopping pattern 400 to the UE. For example, the information may indicate a duration of a hopping frame 430a, 430b, 430c (e.g., 160 ms, 320 ms, etc.), a duration of DRS transmissions (e.g., 2 radio frames, 4 radio frames, etc.) in each hopping frame 430a, 430b, 430c, an M number of non-anchor hopping channels per hopping frame (e.g., M=3 in FIG. 4A), a duration on non-anchor hopping channels (e.g., 14 radio frames, 28 radio frames, etc.), a duration of DL data transmission(s) (e.g., 7 radio frames, 14 radio frames, etc.), a duration of UL data transmission(s) (e.g., 7 radio frames, 14 radio frames, etc.), a channel offset between each of the M non-anchor channels within each hopping frame 430a, 430b, 430c, a channel offset associated with M non-anchor channels located in adjacent hopping frames, a grouping of the M non-anchor channels into M carriers, a fixed offset associated with the non-anchor channels in each of the M carriers, etc. Out of the maximum number of narrowband channels (e.g., 100 narrowband channels) within the wideband channel, the information may also indicate that communications between the base station and the UE may occur on a subset of the maximum number of narrowband channels (e.g., 50 out of 100 of the narrowband channels).

In the example illustrated in FIG. 4A, the frequency hopping pattern 400 may include a plurality of frames 430a, 430b, 430c that each include a plurality of anchor channels (e.g., three anchor channels) and a plurality of non-anchor channels (e.g., three anchor channels). The first hopping frame 430a may include the anchor channels 404a, 404b, 404c, the first non-anchor channel 406a, the second non-anchor channel 406b, and the third non-anchor channel 406c. The second hopping frame 430b may include the anchor channels 404a, 404b, 404c, the second non-anchor channel 406b, the third non-anchor channel 406c, and the fourth non-anchor channel 406d. The third hopping frame 430c may include the anchor channels 404a, 404b, 404c, the (N−2)th non-anchor channel 406e, the (N−1)th non-anchor channel 406f, and the Nth non-anchor channel 406g. In certain configurations, the non-anchor hopping channels located in a particular hopping frame may be contiguous non-anchor hopping channels within the wideband. In certain other configurations, the non-anchor hopping channels located in a particular hopping frame may be non-contiguous non-anchor hopping channels within the wideband. In certain other configurations, the anchor channels 404a, 404b, 404c may be contiguous channels within the wideband. In certain other configurations, the anchor channels 404a, 404b, 404c may be non-contiguous channels within the wideband.

In certain configurations, each of the M non-anchor channels across multiple hopping frames 430a, 430b, 430c may be grouped into M carriers. Each of the M carriers (e.g., carrier 0 (CA0), carrier 1 (CA1), and carrier 2 (CA2), where M=3) may occupy a set of non-anchor channels across the plurality of frames 430a, 430b, 430c. In the example illustrated in FIG. 4A, CA0 may occupy the first non-anchor channel 406a in the first hopping frame 430a, the second non-anchor channel 406b in the second hopping frame 430b, and the (N−2)th non-anchor channel 406e in the third hopping frame 430c. As also seen in the example illustrated in FIG. 4A, CA1 may occupy the second non-anchor channel 406b in the first hopping frame 430a, the third non-anchor channel 406c in the second hopping frame 430b, and the (N−1)th non-anchor channel 406f in the third hopping frame 430c. As also seen in the example illustrated in FIG. 4A, CA2 may occupy the third non-anchor channel 406c in the first hopping frame 430a, the fourth non-anchor channel 406d in the second hopping frame 430b, and the Nth non-anchor channel 406g in the third hopping frame 430c.

By way of example, when N=8, CA0 may be associated with the non-anchor channel hopping sequence [1, 2, 6], CA1 is associated with the non-anchor channel hopping sequence [2, 3, 7], and CA2 is associated with the non-anchor channel hopping sequence [3, 4, 8]. In other words, the non-anchor channel hopping sequence may be a pseudo-random hopping sequence with different fixed offsets between non-anchor channels in different hopping frames. For example, the fixed offset between the first non-anchor channel of a carrier in first hopping frame 430a and the second non-anchor channel of the same carrier in second hopping frame 430b is one non-anchor channel, and the fixed offset between the second non-anchor hopping channel of the same carrier in the second hopping frame 430b and the third non-anchor carrier of the same carrier in the third hopping frame 430c is four non-anchor hopping channels.

Each of the M carriers may serve the same or different UEs. In certain configurations, CA0, CA1, and CA2 may each serve UE 0. In certain other configurations, CA0 and CA1 may serve UE 0, and CA2 may serve UE 1. In certain other configurations, CA0 may serve UE 0, CA1 may serve UE 1, and CA 2 may serve UE 2.

In certain aspects, each of the M carriers may have a same frame structure. For example, as illustrated in FIG. 4A, CA0 includes a first portion 410 for DL data, and a second portion 412 for UL data received from UE 0. CA1 may include a first portion 414 for DL data, and a second portion 416 for UL data received from UE 1. CA2 may include a first portion 418 for DL data, and a second portion 420 for UL data received from UE 2.

In certain configurations, the first portion 410, 414, 418 for CA0, CA1, and CA2 may be associated with DL data transmitted to UE 0, UE 1, and UE 2, respectively. In other words, the DL data in the first portions 410, 414, 418 for UE 0, UE 1, and UE 2 may be transmitted concurrently in the time domain.

In certain other configurations, a first duration 440a of each of the first portions 410, 414, 418 may be reserved for DL data transmitted to UE 0, a second duration 440b of each of the first portions 410, 414, 418 may be reserved for DL data transmitted to UE 1, and a third duration 440c of each of the first portions 410, 414, 418 may be reserved for DL data transmitted to UE 2. In other words, the DL data for UE 0, UE 1, and UE 2 may be time division multiplexed (TDM) in each of the M carriers.

In certain other configurations, a total bandwidth of each of the M carriers may meet a bandwidth threshold criteria (e.g., 180 kHz, 200 kHz, 1 RB, etc.). In other words, the base station may schedule DL data on each of the M carriers for one or more UEs concurrently to ensure the DL bandwidth is at least 500 kHz (e.g., the minimum bandwidth requirement for DTS mode). When the base station has DL data to schedule for a single UE instead of multiple UEs and the single UE is not served by all of the M carriers, the DL data in the second portion 420 may be transmitted on a first carrier of the M carrier (e.g., CA0 in FIG. 4A), and a retransmission of the DL data in the second portion 420 may be transmitted on the remaining carriers of the M carriers (e.g., CA1 and CA2 in FIG. 4A) to ensure that the minimum DL bandwidth is at least 500 kHz. In certain other configurations, when there is no DL data to be scheduled, the base station may send a reservation signal on each of the M carriers in order to meet the minimum DL bandwidth criteria. In the case of a single UE or no DL data to schedule, the power consumption at the base station may be increased in order to repeat DL data transmissions on multiple carriers, or to transmit reservation signals on multiple carriers.

Using the techniques described above in connection with FIG. 4A, a narrowband system of the present disclose may be able to meet the minimum bandwidth criteria and the PSD limit for DL data when the base station operates in DTS mode, and to meet the minimum number of hopping frequencies for UL data when the UE operates in frequency hopping mode.

Figure 4B:
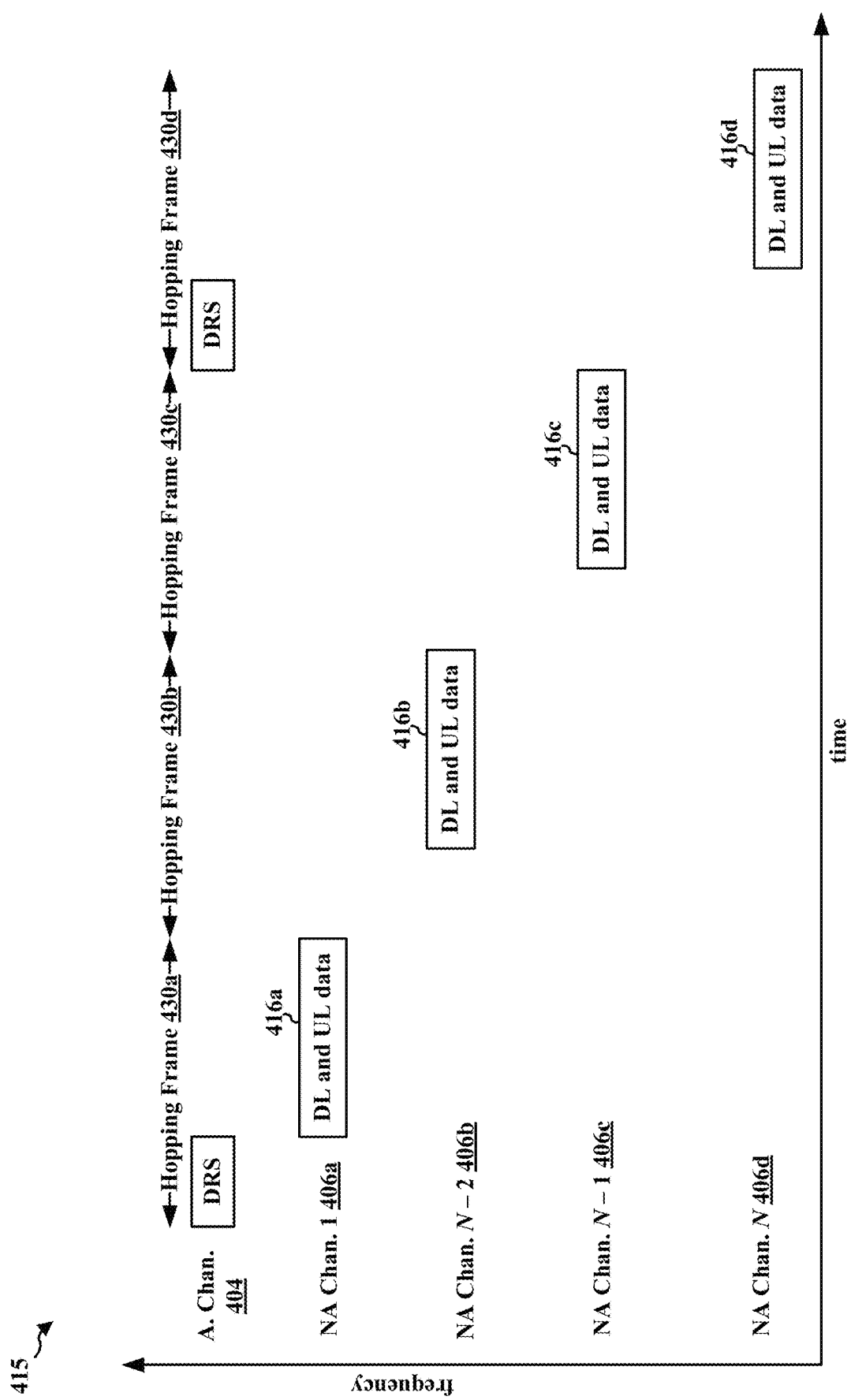
FIG. 4B illustrates a frequency hopping pattern that may be used for narrowband communications in the unlicensed frequency spectrum between a base station and a UE in accordance with certain aspects of the disclosure.

FIG. 4B illustrates a frequency hopping pattern 415 that may be used for narrowband communications in the unlicensed frequency spectrum between a base station and a UE in accordance with certain aspects of the disclosure. The frequency hopping pattern 415 illustrated in FIG. 4B may be used for narrowband communications between a base station (e.g., base station 102, 180, 502, 1050, eNB 301, the apparatus 702/702') operating in frequency hopping mode and a UE (e.g., UE 104, 350, 504a, 504b, 750, the apparatus 1002/1002') operating in frequency hopping mode. Because the base station is operating in frequency hopping mode in the unlicensed frequency spectrum, DL data may be sent to the UE in N≥x (e.g., x=50) hopping frequencies that each have at least a minimum bandwidth (e.g., 180 kHz, 200 kHz, etc.). Because the UE is operating in frequency hopping mode in the unlicensed frequency spectrum, the UE may send UL data to the base station in N≥x (e.g., x=50) hopping frequencies that each have at least a minimum bandwidth (e.g., 180 kHz, 200 kHz, etc.).

At the start of every K hopping frames (e.g., K is equal to four in FIG. 4B), the base station may transmit a DRS (e.g., NPSS, NSSS, NPBCH, and SIB-BR etc.) in the anchor channel 404 to at least one UE. The NPSS and NSSS may be used by a UE for initial synchronization, cell acquisition, timing estimation, and/or frequency estimation. In FIG. 4B, a DRS is transmitted at the start of the first hopping frame 430a and the fourth hopping frame 430d.

After performing DRS transmission on anchor channel 404 in the first hopping frame 430a, the base station may hop to the first non-anchor channel 406a, the second non-anchor channel 406b, and the third non-anchor channel 406c for DL data and/or UL data communications for the remainder of the K−1 hopping frames (e.g., the portion of the first hopping frame 430a on first non-anchor channel 406a, the entirety of the second hopping frame 430b, and the entirety of the third hopping frame 430c) before revisiting anchor channel 404 for a DRS transmission during the fourth hopping frame 430d.

In order to increase the probability of successful communication of DL data and/or UL data, a particular duration (e.g., dwell period) of each of the non-anchor channels 406a, 406b, 406c, 406d may be used to accommodate a minimum number of DL control repetitions, DL data repetitions, UL control repetitions, and/or UL data repetitions. To ensure equal channel occupancy for each of the hopping frequencies (e.g., the anchor channel 404, first non-anchor channel 406a, second non-anchor channel 406b, third non-anchor channel 406c, fourth non-anchor channel 406d, etc.), the frequency hopping system may perform multiple non-anchor hops (e.g., non-anchor channels 406a, 406b, 406c) within a K−1 hopping frame period before returning to anchor channel 404. In certain aspects, the average time of occupancy on any channel may not be greater than 0.4 seconds within a period of 0.4 seconds multiplied by the number of hopping channels employed.

Although three non-anchor channels 406a, 406b, 406c are depicted in K−1 hopping frames in FIG. 4B, more or fewer than three non-anchor hopping channels may be included in K−1 hopping frames without departing from the scope of the present disclosure.

After L number of hops between non-anchor hopping channels (e.g., where L is equal to 3 in the example illustrated in FIG. 4B), the UE may return to the anchor channel 404 to monitor for DRS in order to reduce synchronization delay. In other words, at the end of each K−1 hopping frames, the base station and the UE may return to the anchor channel 404 for the communication of DRS in the anchor channel 404. Consider an example not illustrated in FIG. 4B in which K−1 hopping frames (e.g., hopping frames 430a, 430b, 430c) include 7 non-anchor channels that each include 16 radio frames. Here, a total duration on the non-anchor hopping channels may be 1120 ms, and the duration on the anchor channel 404 may be 20 ms. Consequently, the UE may attempt cell acquisition, synchronization, timing estimation, and/or frequency estimation every 1120 ms.

When the duration of DRS transmission(s) on the anchor channel 404 is reduced as compared to DL data/UL data transmission(s) on a non-anchor channel 406a, 406b, 406c, 406d, the UE may return to the anchor channel 404 more often (as compared to using a longer DRS duration) to allow for faster acquisition. As the minimum number of hopping frequencies (e.g., the anchor channel and non-anchor channels) may be 50 channels, how often the anchor channel is visited may determine the acquisition delay. For a hopping frame with a duration of 160 ms, when the DRS transmission(s) on the anchor channel 404 is 10 ms, K may be equal to four, and the delay between adjacent hops to the anchor channel (adjacent DRS transmissions) may be 0.64 s. For a hopping frame with a duration of 160 ms, when the DRS transmission(s) on the anchor channel 404 is 20 ms, K may be equal to seven, and the delay between adjacent hops to the anchor channel (adjacent DRS transmissions) may be 1.12 s. In other words, the delay between DRS transmissions on adjacent hops to the anchor channel 404 may not scale with the duration of the hopping frame.

Using the techniques described above in connection with FIG. 4B, a narrowband system of the present disclose may be able to meet the minimum channel requirement when the base station and the UE are operating in frequency hopping mode. However, the acquisition time for the UE may be undesirably long when both the base station and the UE operate in frequency hopping mode, and thus, the base station may use hybrid mode, e.g., described below in connection with FIG. 4C.

Figure 4C:
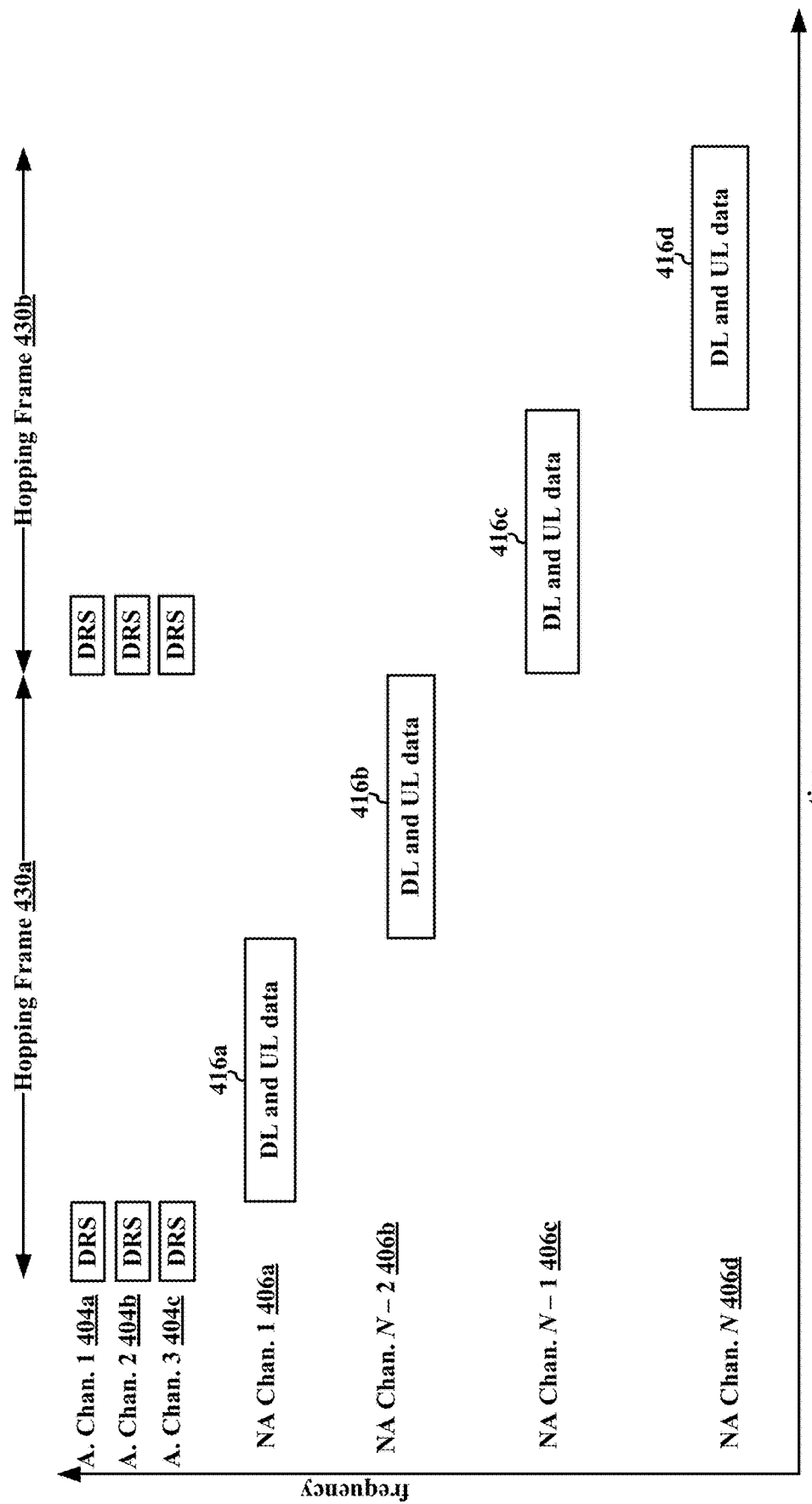
FIG. 4C illustrates a frequency hopping pattern that may be used for narrowband communications in the unlicensed frequency spectrum between a base station and a UE in accordance with certain aspects of the disclosure.

FIG. 4C illustrates a frequency hopping pattern 445 that may be used for narrowband communications in the unlicensed frequency spectrum between a base station and a UE in accordance with certain aspects of the disclosure. The frequency hopping pattern 430 illustrated in FIG. 4B may be used for narrowband communications between a base station (e.g., base station 102, 180, 502, 1050, eNB 301, the apparatus 702/702') operating in hybrid mode and a UE (e.g., UE 104, 350, 504a, 504b, 750, the apparatus 1002/1002') operating in frequency hopping mode. Because the base station is operating in hybrid mode in the unlicensed frequency spectrum, DRS sent from the base station may occupy at least a minimum bandwidth (e.g., 500 kHz), and DL data may be sent to the UE in N≥x (e.g., x=50) hopping frequencies that each have at least a minimum bandwidth (e.g., 180 kHz, 200 kHz, etc.). Because the UE is operating in frequency hopping mode in the unlicensed frequency spectrum, the UE may send UL data to the base station in N≥x (e.g., x=50) hopping frequencies that each have at least a minimum bandwidth (e.g., 180 kHz, 200 kHz, etc.).

A base station operating in hybrid mode may use the frequency hopping pattern 430 illustrated in FIG. 4C to monitor, receive, and/or transmit signals by switching among different frequency channels (e.g., anchor channels 404a, 404b, 404c and non-anchor channels 406a, 406b, 406c, 406d) to exploit the frequency diversity of the unlicensed frequency spectrum.

At the start of each hopping frame 430a, 430b, the base station may concurrently transmit a DRS (e.g., NPSS, NSSS, NPBCH, and SIB-BR etc.) in each of the plurality of anchor channels 404a, 404b, 404c to at least one UE. The NPSS and NSSS may be used by a UE for initial synchronization, cell acquisition, timing estimation, and/or frequency estimation. In certain configurations, the base station may transmit NPSS and NSSS in the first anchor channel 404a, NPBCH in the second anchor channel 404b, and SIB-BR in the third anchor channel 404c. In certain configurations, NPSS, NSSS, PBCH, and SIB-BR may be transmitted in each of the anchor channels 404a, 404b, 404c.

Because the bandwidth of each anchor channel 404a, 404b, 404c may be limited to the bandwidth capability of the UE's receiver (e.g., 1 RB, 180 kHz, 200 kHz, etc.), the bandwidth requirement (e.g., 180 kHz) associated with hybrid mode for transmitting DRS may be satisfied. Each of the non-anchor channels 406a, 406b, 406c, 406d may be used to communicate DL data and UL data. The UL data may be communicated by a UE operating in frequency hopping mode. Although each hopping frame 430a, 430b is illustrated as including two non-anchor channels, a single non-anchor hopping channel may be included in each hopping frame 430a, 430b without departing from the scope of the present disclosure.

In certain configurations, the DRS transmission may not be subject to minimum DL bandwidth, and hence, the base station may transmit the DRS on a single anchor channel (e.g., as in FIG. 4B). In certain other configurations, the UE and/or base station may return to the anchor channel after every hop to the non-anchor channel (not illustrated in FIG. 4C).

Using the techniques described above in connection with FIG. 4C, the base station may use DTS mode for DRS transmission to avoid the bandwidth requirement in which transmitting on a single anchor channel may require communication with a 3 RB UE receiver or complex multi-UE scheduling, and the long acquisition time associated with frequency hopping mode (e.g., single anchor channel) for DRS transmission.

Figure 5:
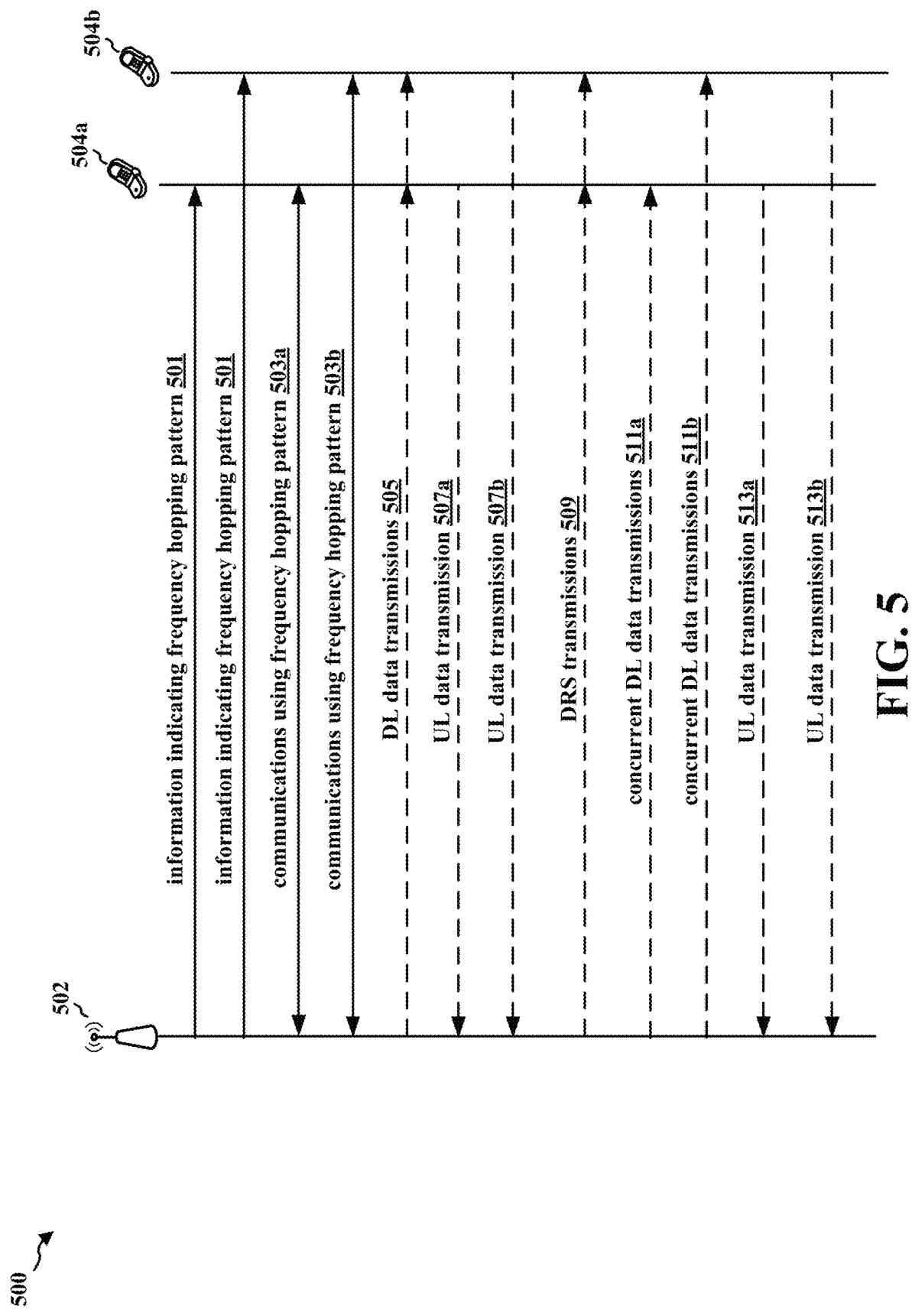
FIG. 5 illustrates a data flow that may be used for narrowband communications using the unlicensed frequency spectrum in accordance with certain aspects of the disclosure.

FIG. 5 illustrates a data flow 500 that may be used by a base station 502 and a plurality of UEs 504a, 504b for narrowband communication using the unlicensed frequency spectrum in accordance with certain aspects of the disclosure. Base station 502 may correspond to, e.g., base station 102, 180, 1050, eNB 310, apparatus 702/702'. First UE 504a may correspond to, e.g., UE 104, 350, 750, the apparatus 1002/1002'. Second UE 504b may correspond to, e.g., UE 104, 350, 750, the apparatus 1002/1002'. In addition, the base station 502 and the UEs 504a, 504b may be configured to communicate using a frequency hopping pattern in the unlicensed frequency spectrum. For example, the base station 502 and UEs 504a, 504b may be NB-IoT devices and/or eMTC devices. In FIG. 5, optional operations are indicated with dashed lines.

In certain configurations, the base station 502 may transmit (at 501) information indicating a narrowband frequency hopping pattern (e.g., frequency hopping patterns 400, 415, 430 in FIGS. 4A, 4B, and 4C, respectively). The information may be transmitted in an MIB/SIB, a broadcast communication, or a unicast communication. In certain aspects, the narrowband frequency hopping pattern may include a plurality of frames (e.g., hopping frames 430a, 430b, 430c in FIG. 4A; hopping frames 430a, 430b, 430c, 430d in FIG. 4B, and hopping frames 430a, 430b in FIG. 4C). In certain aspects, each of the plurality of frames may include a plurality of anchor channels (e.g., anchor channels 404a, 404b, 404c in FIGS. 4A and 4C) and at least one non-anchor channel (e.g., non-anchor channels 406a, 406b, 406c in the first hopping frame 430a in FIG. 4A; non-anchor channels 406b, 406c, 406d in the second hopping frame in FIG. 4A; non-anchor channels 406e, 406f, 406g in the third hopping frame in FIG. 4A; non-anchor channels 406a, 406b in the first hopping frame 430a in FIG. 4C; and non-anchor channels 406c, 406d in the second hopping frame 430b in FIG. 4C).

In certain aspects, the at least one non-anchor channel in each of the plurality of frames may include M non-anchor channels within a wideband. For example, referring to FIG. 4A, the frequency hopping pattern 400 includes M non-anchor channels in each of the hopping frames 430a, 430b, 430c.

In certain other aspects, the M non-anchor channels may be grouped into M carriers across a plurality of frames. For example, referring to FIG. 4A, the M non-anchor channels are grouped across each of the hopping frames 430a, 430b, 430c in to carriers CA0, CA1, and CA2.

In certain other aspects, each of the M carriers may occupy a set of adjacent non-anchor channels in each of the plurality of frames. For example, referring to FIG. 4A, each of the M carriers are located in adjacent non-anchor channels (e.g., non-anchor channels 406a, 406b, 406c in hopping frame 430a) within each of the hopping frames.

In certain other configurations, the base station 502 may communicate (at 503a, 503b) with the first UE 504a and the second UE 504b using the narrowband frequency hopping pattern (e.g., frequency hopping patterns 400, 415, 430 in FIGS. 4A, 4B, and 4C, respectively).

In certain configurations, the base station 502 may communicate with the first UE 504a and the second UE 504b by transmitting (at 505) a plurality of downlink transmissions (e.g., DL data in the first portions 410, 414, 418 in FIG. 4A) to the first UE 504a and the second UE 504b concurrently in each of the M carriers (e.g., CA0, CA1, CA2 in FIG. 4A) in each hopping frame (e.g., hopping frames 430a, 430b, 430c in FIG. 4A).

In certain other configurations, the base station 502 may communicate with the first UE 504a and the second UE 504b by receiving (at 507a, 507b) a plurality of uplink transmissions (e.g., UL data in the second portions 412, 416, 420 in FIG. 4A) from the first UE 504a and the second UE 504b concurrently in the M carriers (e.g., CA0, CA1, and CA2 in FIG. 4A) in each hopping frame (e.g., hopping frames 430a, 430b, 430c in FIG. 4A).

In certain aspects, a first portion of each of the M carriers may be allocated for downlink transmissions and a second portion of each of the M carriers may be allocated for uplink transmissions. In certain other aspects, the second portion may be located subsequent to the first portion in a time domain. For example, referring to FIG. 4A, first portions 410, 414, 418 may be allocated for DL data for UE 0, UE 1, and UE 2 on CA0, CA1, and CA2, respectively, and second portions 412, 416, 420 may be allocated for UL data from UE 0, UE 1, and UE 2 on CA0, CA1, and CA2, respectively.

In certain other aspects, each of the M carriers may be associated with a respective hopping sequence across a plurality of frames. For example, referring to FIG. 4A, when N=8, CA0 may be associated with the non-anchor channel hopping sequence [1, 2, 6], CA1 is associated with the non-anchor channel hopping sequence [2, 3, 7], and CA2 is associated with the non-anchor channel hopping sequence [3, 4, 8].

In certain other aspects, the respective hopping sequence may include a fixed offset between contiguous non-anchor hopping channels in the M carrier. For example, referring to FIG. 4A, the fixed offset between the first non-anchor channel of a carrier in first hopping frame 430a and the second non-anchor channel of the same carrier in second hopping frame 430b is one non-anchor channel, and the fixed offset between the second non-anchor hopping channel of the same carrier in the second hopping frame 430b and the third non-anchor carrier of the same carrier in the third hopping frame 430c is four non-anchor hopping channels.

In certain other configurations, the base station 502 may communicate with the first UE 504a and the second UE 504b using the frequency hopping pattern by concurrently transmitting (at 509) a DRS in each of the plurality of anchor channels (e.g., anchor channels 404a, 404b, 404c in FIG. 4A) at a start of each hopping frame (e.g., hopping frames 430a, 430b, 430c in FIG. 4A).

In certain aspects, each of the M carriers may comprise a same frame structure. For example, as illustrated in FIG. 4A, CA0 includes a first portion 410 for DL data, and a second portion 412 for UL data received from UE 0. CA1 may include a first portion 414 for DL data, and a second portion 416 for UL data received from UE 1. CA2 may include a first portion 418 for DL data, and a second portion 420 for UL data received from UE 2.

In certain other aspects, a total bandwidth of each of the M carriers meets a bandwidth threshold criteria. For example, referring to FIG. 4A, each of the M carriers (CA0, CA1, CA2 in each hopping frame 430a, 430b, 430c) may have a bandwidth of at least, e.g., 1 RB, 180 kHz, 200 kHz, etc.

In certain configurations, the base station 502 may communicate with the first UE 504a and not the second UE 504b. Here, the plurality of downlink transmissions transmitted (at 505) may include an initial downlink transmission transmitted on one of the M carriers and downlink retransmissions transmitted on a subset of the M carriers. For example, referring to FIG. 4, when the base station has DL data to schedule for a single UE instead of multiple UEs and the single UE is not served by all of the M carriers, the DL data in the second portion 420 may be transmitted on a first carrier of the M carrier, and a retransmission of the DL data in the second portion 420 may be transmitted on the remaining carriers of the M carriers to ensure that the minimum DL bandwidth is at least 500 kHz.

In certain other configurations, when the base station 502 does not have any DL data to schedule for either the first UE 504a or the second UE 504b, the base station 502 may transmit a reservation signal in the downlink data portion of each of the M carriers (e.g., 410 on CA0, 414 on 4CA1, and 418 on CA2 in FIG. 4A).

In certain other configurations, the base station 502 may communicate with the first UE 504a and the second UE 504b using the narrowband frequency hopping pattern by concurrently transmitting (at 511a) a first downlink transmission to the first UE 504a in a first portion (e.g., second duration 440b in FIG. 4A) of each of the M carriers (e.g., CA0, CA1, CA2 in FIG. 4A).

In certain other configurations, the base station 502 may communicate with the first UE 504a and the second UE 504b using the narrowband frequency hopping pattern by concurrently transmitting (at 511b) a second downlink transmission to the second UE 504a in a second portion (e.g., third duration 440c in FIG. 4A) of each of the M carriers (e.g., CA0, CA1, CA2 in FIG. 4A). In certain aspects, the second portion (e.g., third duration 440c in FIG. 4A) may be subsequent to the first portion (e.g., second duration 440b in FIG. 4A) in a time domain.

In certain other configurations, the base station 502 may communicate with the first UE 504a and the second UE 504b using the narrowband frequency hopping pattern by receiving (at 513a) a first uplink transmission in a third portion (e.g., UL data in the second portion 412 on CA0 in FIG. 4A) of a first carrier (e.g., CA0 in FIG. 4A) of the M carriers.

In certain other configurations, the base station 502 may communicate with the first UE 504a and the second UE 504b using the narrowband frequency hopping pattern by receiving (at 513b) a second uplink transmission in the third portion (e.g., UL data in the second portion 416 on CA1 in FIG. 4A) of a second carrier (e.g., CA1 in FIG. 4A) of the M carriers. In certain aspects, the first uplink transmission and the second uplink transmission may be received concurrently. In certain other aspects, the third portion (e.g., UL data in the second portion 412 in FIG. 4A) may be adjacent to the second portion (e.g., second duration 440b in FIG. 4A) in the time domain.

Figure 6:
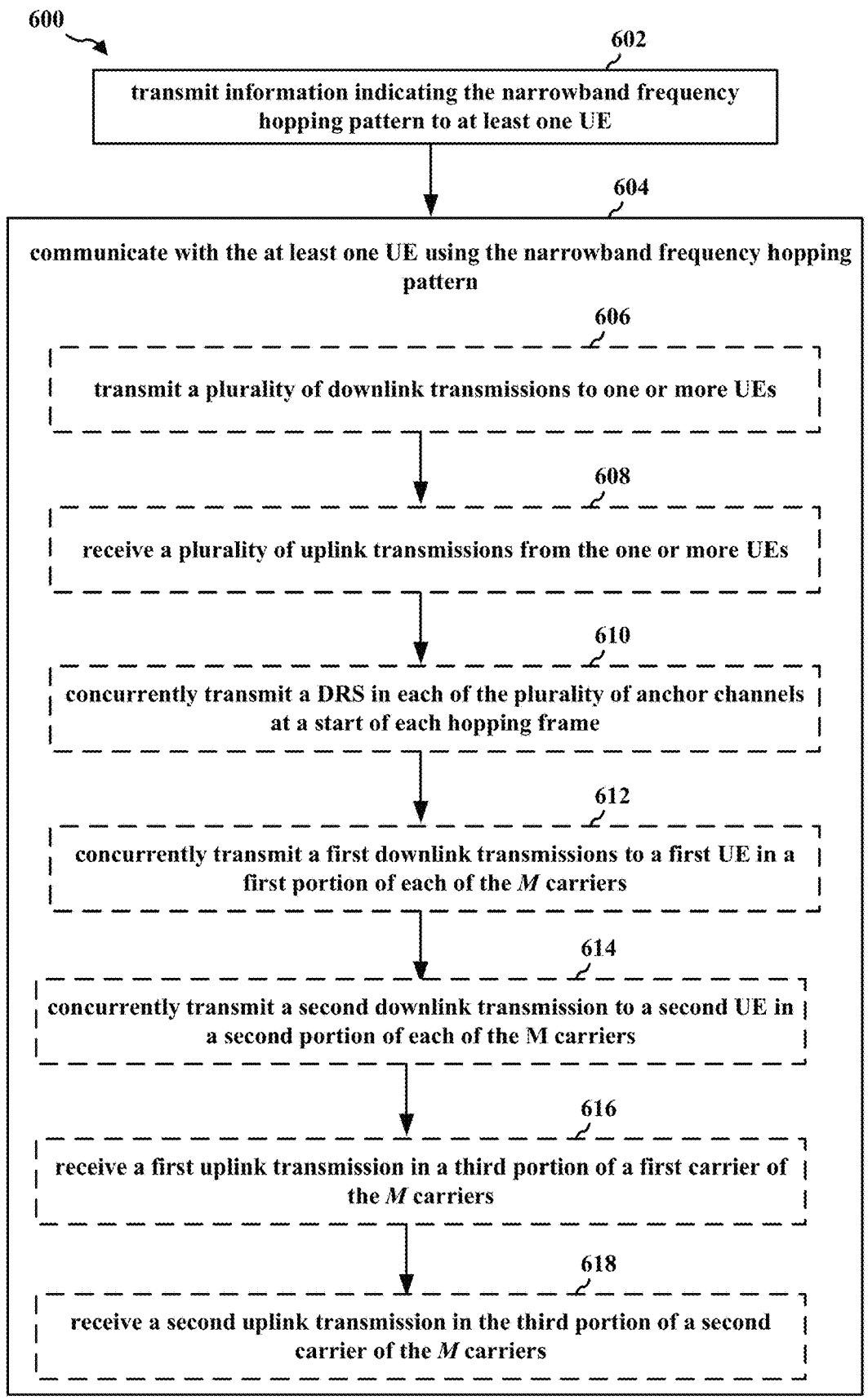
FIG. 6 is a flowchart of a method of wireless communication.

FIG. 6 is a flowchart 600 of a method of wireless communication. The method may be performed by a base station (e.g., base station 102, 180, 502, 1050, eNB 310, apparatus 702/702'). In FIG. 6, optional operations are indicated with dashed lines.

At 602, the base station may the base station 502 may transmit information indicating a narrowband frequency hopping pattern (e.g., frequency hopping patterns 400, 415, 430 in FIGS. 4A, 4B, and 4C, respectively).

In certain aspects associated with the operation at 602, the narrowband frequency hopping pattern (e.g., frequency hopping patterns 400, 415, 430 in FIGS. 4A, 4B, and 4C, respectively) may include a plurality of frames (e.g., hopping frames 430a, 430b, 430c in FIG. 4A; hopping frames 430a, 430b in FIG. 4C).

In certain other aspects associated with the operation at 602, each of the plurality of frames may include a plurality of anchor channels (e.g., anchor channels 404a, 404b, 404c in FIGS. 4A and 4C) and at least one non-anchor channel (e.g., non-anchor channels 406a, 406b, 406c in the first hopping frame 430a in FIG. 4A; non-anchor channels 406b, 406c, 406d in the second hopping frame in FIG. 4A; non-anchor channels 406e, 406f, 406g in the third hopping frame in FIG. 4A; non-anchor channels 406a, 406b in the first hopping frame 430a in FIG. 4C; and non-anchor channels 406c, 406d in the second hopping frame 430b in FIG. 4C).

In certain aspects associated with the operations at 602, the at least one non-anchor channel in each of the plurality of frames may include M non-anchor channels within a wideband. For example, referring to FIG. 4A, the frequency hopping pattern 400 includes non-anchor channels (406a, 406b, 406c; 406b, 406c, 406d; 406e, 406f, 406g) in each of the hopping frames 430a, 430b, 430c.

In certain other aspects associated with the operation at 602, the M non-anchor channels may be grouped into M carriers across a plurality of frames. For example, referring to FIG. 4A, the M non-anchor channels are grouped across each of the hopping frames 430a, 430b, 430c in to carriers CA0, CA1, and CA2.

In certain other aspects associated with the operation at 602, each of the M carriers may occupy a set of adjacent non-anchor channels in each of the plurality of frames. For example, referring to FIG. 4A, each of the M carriers are located in contiguous non-anchor channels (e.g., non-anchor channels 406a, 406b, 406c) within each of the hopping frames 430a, 430b, 430c.

In certain other aspects associated with the operation at 602, the at least one non-anchor hopping channel may include a single non-anchor hopping channel. For example, referring to FIG. 4C, although each hopping frame 430a, 430b is illustrated as including two non-anchor channels, a single non-anchor hopping channel may be included in each hopping frame 430a, 430b without departing from the scope of the present disclosure.

In certain other aspects associated with the operation at 602, each of the M carriers may be associated with a respective hopping sequence across a plurality of frames. For example, referring to FIG. 4A, when N=8, CA0 may be associated with the non-anchor channel hopping sequence [1, 2, 6], CA1 is associated with the non-anchor channel hopping sequence [2, 3, 7], and CA2 is associated with the non-anchor channel hopping sequence [3, 4, 8].

In certain other aspects associated with the operation at 602, the respective hopping sequence may include a fixed offset between contiguous non-anchor hopping channels in the M carrier. In certain other aspects associated with the operation at 602, the respective hopping sequence may comprise a pseudo-random hopping sequence. For example, referring to FIG. 4A, the fixed offset between the first non-anchor channel of a carrier in first hopping frame 430a and the second non-anchor channel of the same carrier in second hopping frame 430b is one non-anchor channel, and the fixed offset between the second non-anchor hopping channel of the same carrier in the second hopping frame 430b and the third non-anchor carrier of the same carrier in the third hopping frame 430c is four non-anchor hopping channels.

In certain other aspects associated with the operation at 602, each of the M carriers may have a same frame structure. For example, as illustrated in FIG. 4A, CA0 includes a first portion 410 for DL data, and a second portion 412 for UL data received from UE 0. CA1 may include a first portion 414 for DL data, and a second portion 416 for UL data received from UE 1. CA2 may include a first portion 418 for DL data, and a second portion 420 for UL data received from UE 2.

In certain other aspects associated with the operation at 602, a total bandwidth of each of the M carriers meets a bandwidth threshold criteria. For example, referring to FIG. 4A, each of the M carriers (CA0, CA1, CA2 in each hopping frame 430a, 430b, 430c) may have a bandwidth of at least, e.g., 180 kHz, 200 kHz, 1 RB, etc.

At 604, the base station may communicate with the at least one UE using the narrowband frequency hopping pattern. For example, referring to FIGS. 4A, 4B, 4C, and 5, the base station 502 may communicate (at 503a, 503b) with the first UE 504a and the second UE 504b using the narrowband frequency hopping pattern (e.g., frequency hopping patterns 400, 415, 430 in FIGS. 4A, 4B, and 4C, respectively).

At 606, the base station may communicate with the at least one UE using the narrowband frequency hopping pattern by transmitting a plurality of downlink transmissions to the at least one UE concurrently in each of the M carriers. For example, referring to FIGS. 4A and 5, the base station 502 may communicate with the first UE 504a and the second UE 504b by transmitting (at 505) a plurality of downlink transmissions (e.g., DL data in the first portions 410, 414, 418 in FIG. 4A) to the first UE 504a and the second UE 504b concurrently in each of the M carriers (e.g., CA0, CA1, CA2 in FIG. 4A) in each hopping frame (e.g., hopping frames 430a, 430b, 430c in FIG. 4A).

In certain aspects associated with the operation at 606, the one or more UEs include a single UE. In certain other aspects associated with the operation at 606, the plurality of downlink transmissions may include an initial downlink transmission transmitted on one of the M carriers and downlink retransmissions transmitted on a subset of the M carriers. For example, referring to FIG. 4, when the base station has DL data to schedule for a single UE instead of multiple UEs and the single UE is not served by all of the M carriers, the DL data in the second portion 420 may be transmitted on a first carrier of the M carrier, and a retransmission of the DL data in the second portion 420 may be transmitted on the remaining carriers of the M carriers to ensure that the minimum DL bandwidth is at least 500 kHz.

In certain other aspects associated with the operation at 606, the plurality of downlink transmissions may include a reservation signal on each of the M carriers when a data transmission is unavailable. For example, referring to FIGS. 4A and 5, when the base station 502 does not have any DL data to schedule for either the first UE 504a or the second UE 504b, the base station 502 may transmit a reservation signal in the downlink data portion of each of the M carriers (e.g., 410 on CA0, 414 on 4CA1, and 418 on CA2 in FIG. 4A).

At 608, the base station may communicate with the at least one UE using the narrowband frequency hopping pattern by receiving a plurality of uplink transmissions from the at least one UE concurrently in the M carriers. For example, referring to FIGS. 4A and 5, the base station 502 may communicate with the first UE 504a and the second UE 504b by receiving (at 507a, 507b) a plurality of uplink transmissions (e.g., UL data in the second portions 412, 416, 420 in FIG. 4A) from the first UE 504a and the second UE 504b concurrently in the M carriers (e.g., CA0, CA1, and CA2 in FIG. 4A) in each hopping frame (e.g., hopping frames 430a, 430b, 430c in FIG. 4A).

In certain aspects associated with the operation at 608, a first portion of each of the M carriers may be allocated for downlink transmissions and a second portion of each of the M carriers is allocated for uplink transmissions. In certain other aspects associated with the operation at 608, the second portion may be located subsequent to the first portion in a time domain. For example, referring to FIG. 4A, 410, 414, 418 may be allocated for DL data for UE 0, UE 1, and UE 2 on CA0, CA1, and CA2, respectively, and 412, 416, 420 may be allocated for UL data from UE 0, UE 1, and UE 2 on CA0, CA1, and CA2, respectively.

At 610, the base station may communicate with the at least one UE using the narrowband frequency hopping pattern by concurrently transmitting a DRS in each of the plurality of anchor channels at a start of each hopping frame. For example, referring to FIGS. 4A and 5, the base station 502 may communicate with the first UE 504a and the second UE 504b using the frequency hopping pattern by concurrently transmitting (at 509) a DRS in each of the plurality of anchor channels (e.g., anchor channels 404a, 404b, 404c in FIG. 4A) at a start of each hopping frame (e.g., hopping frames 430a, 430b, 430c in FIG. 4A).

At 612, the base station may communicate with the at least one UE using the narrowband frequency hopping pattern by concurrently transmitting a first downlink transmission to a first UE in a first portion. For example, referring to FIGS. 4A and 5, the base station 502 may communicate with the first UE 504a and the second UE 504b using the narrowband frequency hopping pattern by concurrently transmitting (at 511a) a first downlink transmission to the first UE 504a in a first portion (e.g., second duration 440b in FIG. 4A) of each of the M carriers (e.g., CA0, CA1, CA2 in FIG. 4A).

At 614, the base station may communicate with the at least one UE using the narrowband frequency hopping pattern by concurrently transmitting a second downlink transmission to a second UE in a second portion of each of the M carriers. In certain aspects, the second portion may be subsequent to the first portion in a time domain. For example, referring to FIGS. 4A and 5, the base station 502 may communicate with the first UE 504a and the second UE 504b using the narrowband frequency hopping pattern by concurrently transmitting (at 511b) a second downlink transmission to the second UE 504a in a second portion (e.g., third duration 440c in FIG. 4A) of each of the M carriers (e.g., CA0, CA1, CA2 in FIG. 4A). In certain aspects, the second portion (e.g., third duration 440c in FIG. 4A) may be subsequent to the first portion (e.g., second duration 440b in FIG. 4A) in a time domain.

At 616, the base station may communicate with the at least one UE using the narrowband frequency hopping pattern by receiving a first uplink transmission in a third portion of a first carrier of the M carriers. For example, referring to FIGS. 4A and 5, the base station 502 may communicate with the first UE 504a and the second UE 504b using the narrowband frequency hopping pattern by receiving (at 513a) a first uplink transmission in a third portion (e.g., UL data in the second portion 412 on CA0 in FIG. 4A) of a first carrier (e.g., CA0 in FIG. 4A) of the M carriers At 618, the base station may communicate with the at least one UE using the narrowband frequency hopping pattern by receiving a second uplink transmission in the third portion of a second carrier of the M carriers. In certain aspects, the first uplink transmission and the second uplink transmission may be received concurrently. In certain other aspects, the third portion may be adjacent to the second portion in the time domain. For example, referring to FIGS. 4A and 5, the base station 502 may communicate with the first UE 504a and the second UE 504b using the narrowband frequency hopping pattern by receiving (at 513b) a second uplink transmission in the third portion (e.g., UL data in the second portion 416 on CA1 in FIG. 4A) of a second carrier (e.g., CA1 in FIG. 4A) of the M carriers. In certain aspects, the first uplink transmission and the second uplink transmission being received concurrently. In certain other aspects, the third portion (e.g., UL data in the second portions 412 in FIG. 4A) may be adjacent to the second portion (e.g., second duration 440b in FIG. 4A) in the time domain.

Figure 7:
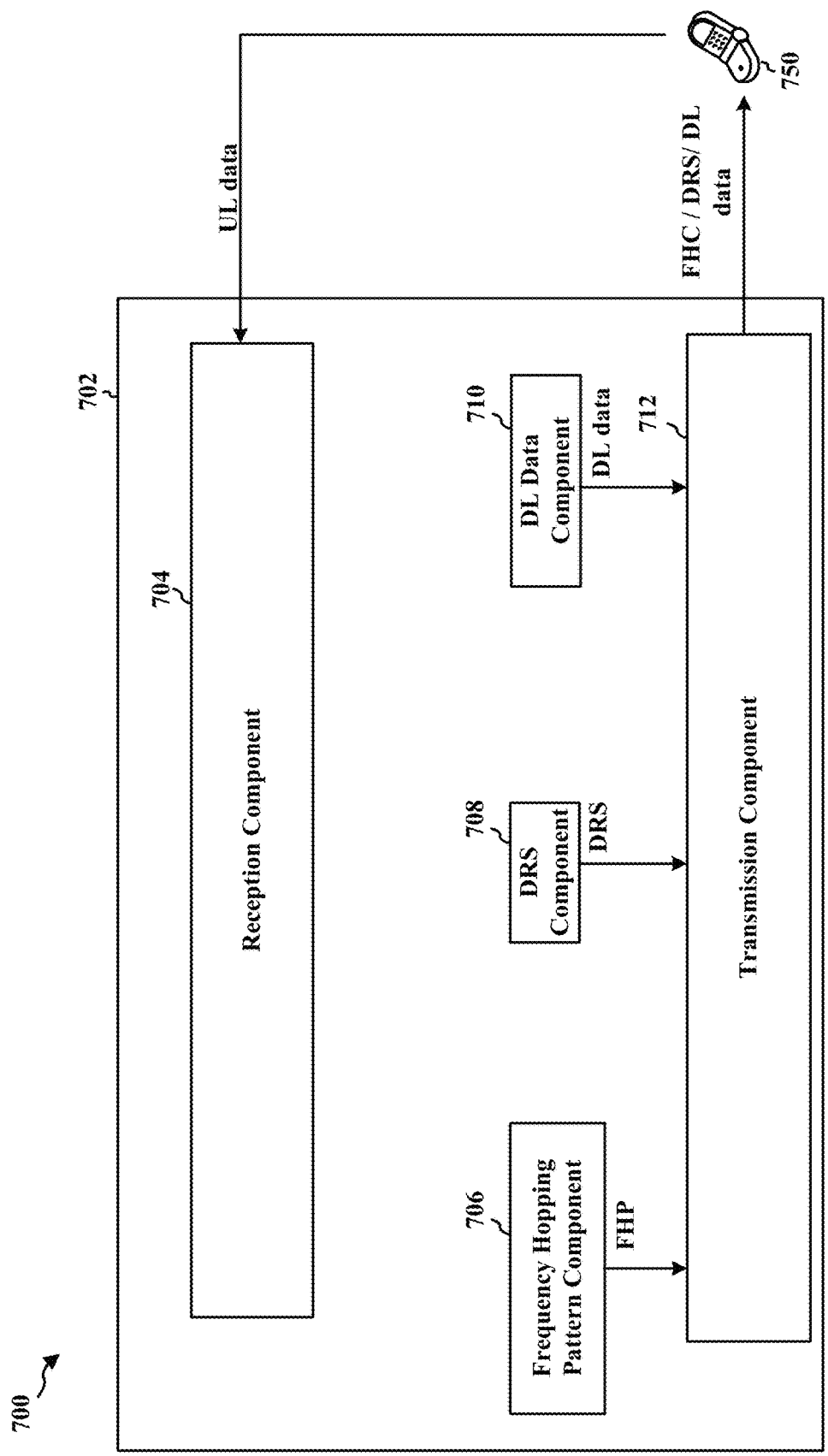
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a base station (e.g., base station 102, 180, 502, 1050, eNB 310, apparatus 702') in communication with at least one UE 750 (e.g., UE 104, 350, first UE 504a, second UE 504b, the apparatus 1002/1002'). The apparatus may include a reception component 704, a frequency hopping pattern (FHP) component 706, a DRS component 708, a DL data component 710, and a transmission component 712.

In certain configurations, the FHP component 706 may be configured to determine a frequency hopping pattern for narrowband communications in the unlicensed frequency spectrum. In certain other aspects, each of the plurality of frames may include a plurality of anchor channels and at least one non-anchor channel. In certain aspects, the at least one non-anchor channel in each of the plurality of frames may include M non-anchor channels within a wideband. In certain other aspects, the M non-anchor channels may be grouped into M carriers across a plurality of frames. In certain other aspects, each of the M carriers may occupy a set of adjacent non-anchor channels in each of the plurality of frames. In certain other aspects, the at least one non-anchor hopping channel may include a single non-anchor hopping channel. In certain other aspects, each of the M carriers may be associated with a respective hopping sequence across a plurality of frames. In certain other aspects, the respective hopping sequence may include a fixed offset between contiguous non-anchor hopping channels in the M carrier. In certain other aspects, the respective hopping sequence may comprise a pseudo-random hopping sequence. In certain other aspects, each of the M carriers may have a same frame structure. In certain other aspects, a total bandwidth of each of the M carriers meets a bandwidth threshold criteria.

The FHP component 706 may be configured to send a signal associated with the FHP to the transmission component 712. The transmission component 712 may be configured to transmit information associated with the FHP to the UE 750.

In certain configurations, the reception component 704 and the transmission component may be configured to communicate with the at least one UE 750 using the FHP.

In certain aspects, the transmission component 712 may be configured to communicate with the at least one UE 750 using the narrowband frequency hopping pattern by transmitting a plurality of downlink transmissions to the at least one UE 750 concurrently in each of the M carriers. In certain configurations, the at least one UE 750 may include a single UE. In certain aspects, the plurality of downlink transmissions may include an initial downlink transmission transmitted on one of the M carriers and downlink retransmissions transmitted on a subset of the M carriers. In certain other aspects, the plurality of downlink transmissions may include a reservation signal on each of the M carriers when a data transmission is unavailable.

In certain other aspects, the reception component 704 may be configured to communicate with the at least one UE 750 using the narrowband frequency hopping pattern by receiving a plurality of uplink transmissions from the at least one UE 750 concurrently in the M carriers. In certain other aspects, a first portion of each of the M carriers may be allocated for downlink transmissions and a second portion of each of the M carriers is allocated for uplink transmissions. In certain other aspects, the second portion may be located subsequent to the first portion in a time domain.

In certain other configurations, the DRS component 708 may be configured to generate one or more DRS transmissions. The DRS component 708 may be configured to send a signal associated with the one or more DRS to the transmission component 712.

In certain other configurations, the transmission component 712 may be configured to communicate with the at least one UE 750 using the narrowband frequency hopping pattern by concurrently transmitting a DRS in each of the plurality of anchor channels at a start of each hopping frame.

In certain other configurations, the DL data component 710 may be configured to generate DL data for the at least one UE 750. The DL data component 710 may be configured to send a signal associated with the DL data to the transmission component 712.

In certain other configurations, the transmission component 712 may be configured to communicate with the at least one UE 650 using the narrowband frequency hopping pattern by concurrently transmitting a first downlink transmission to a first UE in a first portion.

In certain other configurations, the transmission component 712 may be configured to communicate with the at least one UE 750 using the narrowband frequency hopping pattern by concurrently transmitting a second downlink transmission to a second UE in a second portion of each of the M carriers. In certain aspects, the second portion may be subsequent to the first portion in a time domain.

In certain other configurations, the reception component 704 may be configured to communicate with the at least one UE 750 using the narrowband frequency hopping pattern by receiving a first uplink transmission in a third portion of a first carrier of the M carriers.

In certain other configurations, the reception component 704 may be configured to communicate with the at least one UE 750 using the narrowband frequency hopping pattern by receiving a second uplink transmission in the third portion of a second carrier of the M carriers. In certain aspects, the first uplink transmission and the second uplink transmission may be received concurrently. In certain other aspects, the third portion may be adjacent to the second portion in the time domain.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
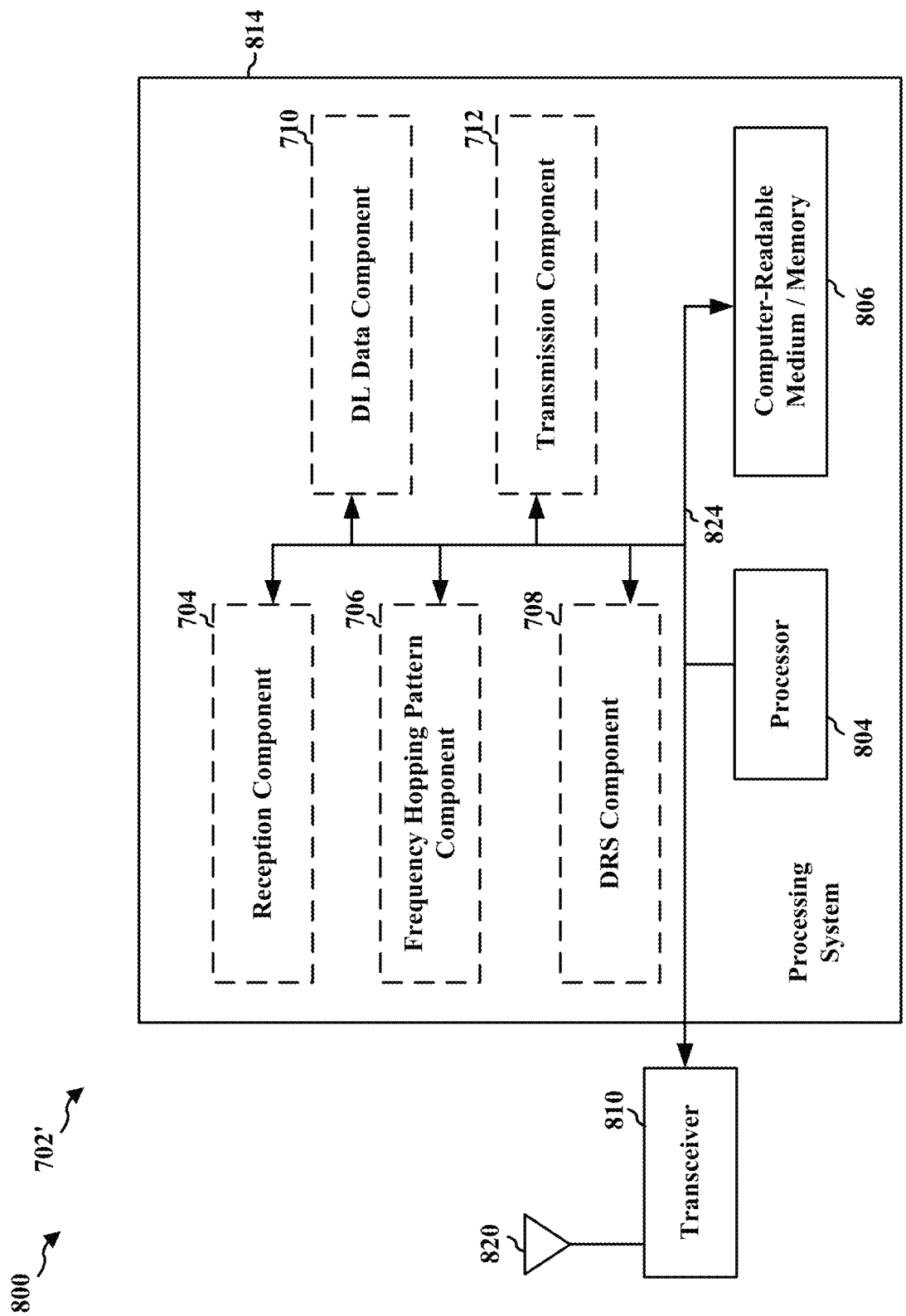
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375.

In certain configurations, the apparatus 702/702' for wireless communication may include means for transmitting information indicating a narrowband frequency hopping pattern to at least one UE. In certain aspects, the narrowband frequency hopping pattern may include a plurality of frames. In certain other aspects, each of the plurality of frames may include a plurality of anchor channels and at least one non-anchor channel. In certain other aspects, each of the plurality of frames may include a plurality of anchor channels and at least one non-anchor channel. In certain aspects, the at least one non-anchor channel in each of the plurality of frames may include M non-anchor channels within a wideband. In certain other aspects, the M non-anchor channels may be grouped into M carriers across a plurality of frames. In certain other aspects, each of the M carriers may occupy a set of adjacent non-anchor channels in each of the plurality of frames. In certain other aspects, the at least one non-anchor hopping channel may include a single non-anchor hopping channel. In certain other aspects, each of the M carriers may be associated with a respective hopping sequence across a plurality of frames. In certain other aspects, the respective hopping sequence may include a fixed offset between contiguous non-anchor hopping channels in the M carrier. In certain other aspects, the respective hopping sequence may comprise a pseudo-random hopping sequence. In certain other aspects, each of the M carriers may have a same frame structure. In certain other aspects, a total bandwidth of each of the M carriers meets a bandwidth threshold criteria. In certain other configurations, the apparatus 702/702' for wireless communication may include means for communicating with the at least one UE using the narrowband frequency hopping pattern by transmitting a plurality of downlink transmissions to the at least one UE concurrently in each of the M carriers. In certain configurations, the at least one UE may include a single UE. In certain aspects, the plurality of downlink transmissions may include an initial downlink transmission transmitted on one of the M carriers and downlink retransmissions transmitted on a subset of the M carriers. In certain other aspects, the plurality of downlink transmissions may include a reservation signal on each of the M carriers when a data transmission is unavailable. In certain aspects, the means for communicating with the at least one using the narrowband frequency hopping pattern may be configured to concurrently transmit a DRS in each of the plurality of anchor channels at a start of each hopping frame. In certain other aspects, the means for communicating with the at least one using the narrowband frequency hopping pattern may be configured to receive a plurality of uplink transmissions from the at least one UE concurrently in the M carriers. In certain other aspects, a first portion of each of the M carriers may be allocated for downlink transmissions and a second portion of each of the M carriers is allocated for uplink transmissions. In certain other aspects, the second portion may be located subsequent to the first portion in a time domain. In certain other aspects, the means for communicating with the at least one using the narrowband frequency hopping pattern may be configured to receive a first uplink transmission in a third portion of a first carrier of the M carriers. In certain other aspects, the means for communicating with the at least one using the narrowband frequency hopping pattern may be configured to receive a second uplink transmission in the third portion of a second carrier of the M carriers. In certain aspects, the first uplink transmission and the second uplink transmission may be received concurrently. In certain other aspects, the third portion may be adjacent to the second portion in the time domain. The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
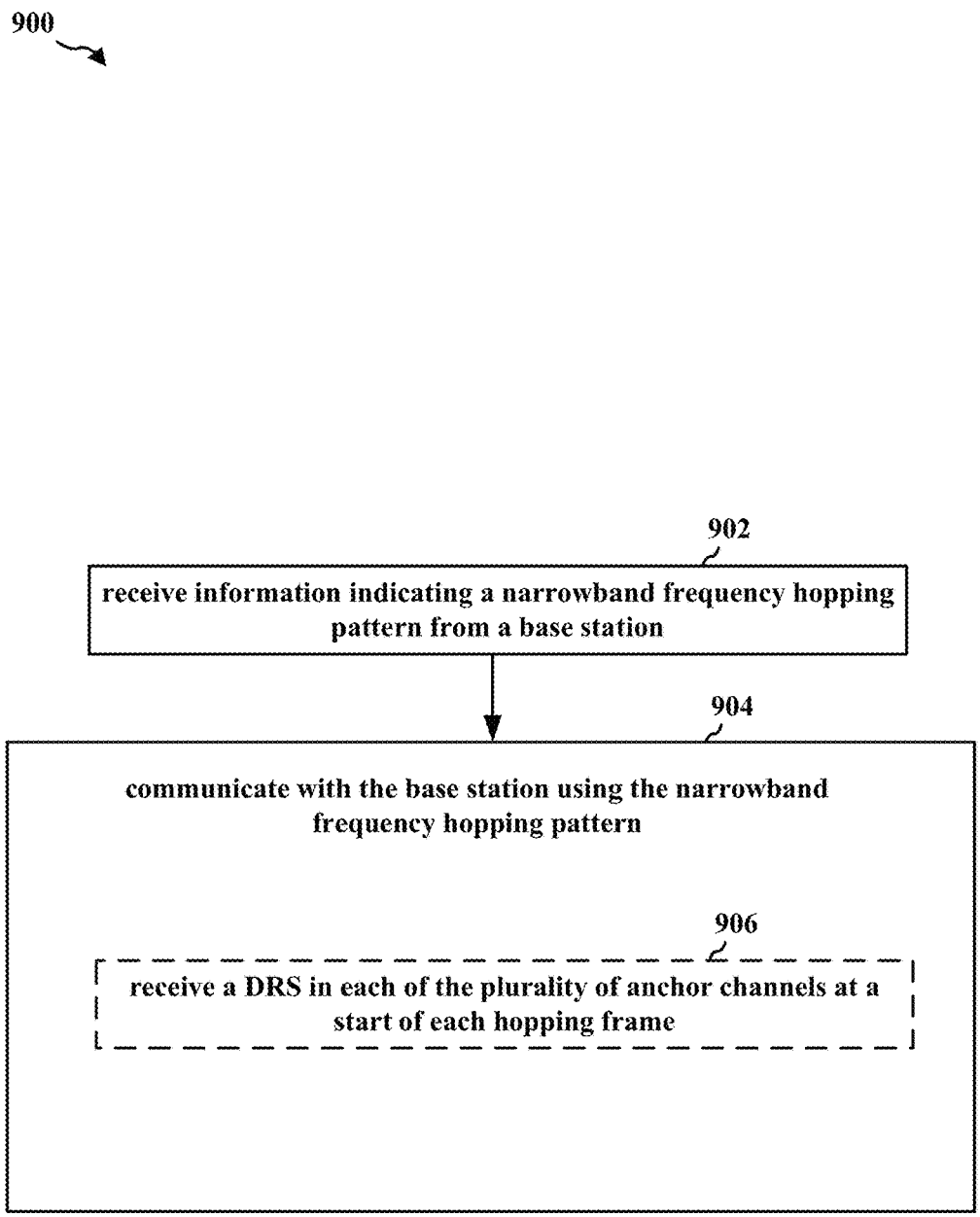
FIG. 9 is a flowchart of a method of wireless communication.

FIG. 9 is a flowchart 900 of a method of wireless communication. The method may be performed by a UE (e.g., UE 104, 350, 504*a*, 504*b*, 750, apparatus 1002/1002'). In FIG. 9, optional operations are indicated with dashed lines.

At 902, the UE may receive information indicating a narrowband frequency hopping pattern (e.g., frequency hopping patterns 400, 415, 430 in FIGS. 4A, 4B, and 4C, respectively) from a base station.

In certain aspects associated with the operation at 902, the narrowband frequency hopping pattern (e.g., frequency hopping patterns 400, 415, 430 in FIGS. 4A, 4B, and 4C, respectively) may include a plurality of frames (e.g., hopping frames 430*a*, 430*b*, 430*c* in FIG. 4A; hopping frames 430*a*, 430*b* in FIG. 4C).

In certain other aspects associated with the operation at 902, each of the plurality of frames may include a plurality of anchor channels (e.g., anchor channels 404*a*, 404*b*, 404*c* in FIGS. 4A and 4C) and at least one non-anchor channel (e.g., non-anchor channels 406*a*, 406*b*, 406*c* in the first hopping frame 430*a* in FIG. 4A; non-anchor channels 406*b*, 406*c*, 406*d* in the second hopping frame in FIG. 4A; non-anchor channels 406*e*, 406*f*, 406*g* in the third hopping frame in FIG. 4A; non-anchor channels 406*a*, 406*b* in the first hopping frame 430*a* in FIG. 4C; and non-anchor channel 406*c*, 406*d* in the second hopping frame 430*b* in FIG. 4C).

In certain aspects associated with the operations at 902, the at least one non-anchor channel in each of the plurality of frames may include M non-anchor channels within a wideband. For example, referring to FIG. 4A, the frequency hopping pattern 400 includes non-anchor channels (406*a*, 406*b*, 406*c*; 406*b*, 406*c*, 406*d*; 406*e*, 406*f*, 406*g*) in each of the hopping frames 430*a*, 430*b*, 430*c*.

In certain other aspects associated with the operation at 902, the M non-anchor channels may be grouped into M carriers across a plurality of frames. For example, referring to FIG. 4A, the M non-anchor channels are grouped across each of the hopping frames 430*a*, 430*b*, 430*c* in to carriers CA0, CA1, and CA2.

In certain other aspects associated with the operation at 902, each of the M carriers may occupy a set of adjacent non-anchor channels in each of the plurality of frames. For example, referring to FIG. 4A, each of the M carriers are located in contiguous non-anchor channels (e.g., non-anchor channels 406*a*, 406*b*, 406*c*) within each of the hopping frames 430*a*, 430*b*, 430*c*.

In certain other aspects associated with the operation at 902, the at least one non-anchor hopping channel may include a single non-anchor hopping channel. For example, referring to FIG. 4C, although each hopping frame 430a, 430b is illustrated as including two non-anchor channels, a single non-anchor hopping channel may be included in each hopping frame 430a, 430b without departing from the scope of the present disclosure.

In certain other aspects associated with the operation at 902, each of the M carriers may be associated with a respective hopping sequence across a plurality of frames. For example, referring to FIG. 4A, when N=8, CA0 may be associated with the non-anchor channel hopping sequence [1, 2, 6], CA1 is associated with the non-anchor channel hopping sequence [2, 3, 7], and CA2 is associated with the non-anchor channel hopping sequence [3, 4, 8].

In certain other aspects associated with the operation at 902, the respective hopping sequence may include a fixed offset between contiguous non-anchor hopping channels in the M carrier. In certain other aspects associated with the operation at 902, the respective hopping sequence may comprise a pseudo-random hopping sequence. For example, referring to FIG. 4A, the fixed offset between the first non-anchor channel of a carrier in first hopping frame 430a and the second non-anchor channel of the same carrier in second hopping frame 430b is one non-anchor channel, and the fixed offset between the second non-anchor hopping channel of the same carrier in the second hopping frame 430b and the third non-anchor carrier of the same carrier in the third hopping frame 430c is four non-anchor hopping channels.

At 904, the UE may communicate with the base station using the narrowband frequency hopping pattern. For example, referring to FIGS. 4A, 4B, 4C, and 5, the base station 502 may communicate (at 503a, 503b) with the first UE 504a and the second UE 504b using the narrowband frequency hopping pattern (e.g., frequency hopping patterns 400, 415, 430 in FIGS. 4A, 4B, and 4C, respectively).

At 906, the UE may communicate with the base station using the narrowband frequency hopping pattern by receiving a DRS in each of the plurality of anchor channels at a start of each hopping frame. For example, For example, referring to FIGS. 4A and 5, the base station 502 may communicate with the first UE 504a and the second UE 504b using the frequency hopping pattern by concurrently transmitting (at 509) a DRS in each of the plurality of anchor channels (e.g., anchor channels 404a, 404b, 404c in FIG. 4A) at a start of each hopping frame (e.g., hopping frames 430a, 430b, 430c in FIG. 4A).

Figure 10:
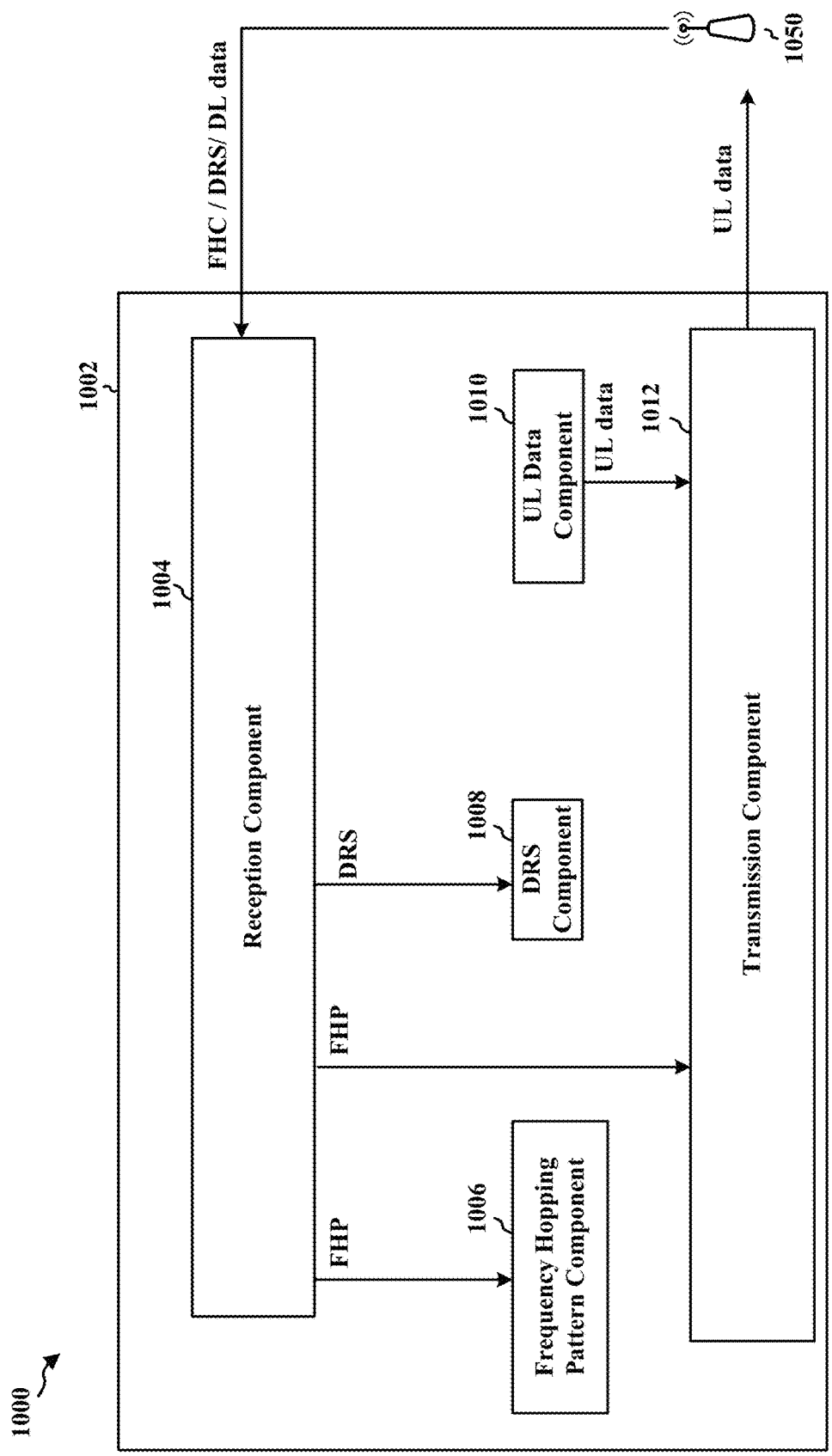
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 504a, 504b, 750, the apparatus 1002') in communication with a base station 1050 (e.g., base station 102, 180, 502, the apparatus 702/702') The apparatus includes a reception component 1004, a FHP component 1006, a DRS component 1008, a UL data component 1010, and a transmission component 1012.

The reception component 1004 may be configured to receive information indicating a narrowband frequency hopping pattern from a base station. In certain aspects, the narrowband frequency hopping pattern may include a plurality of frames. In certain other aspects, each of the plurality of frames may include a plurality of anchor channels and at least one non-anchor channel. In certain aspects, the at least one non-anchor channel in each of the plurality of frames may include M non-anchor channels within a wideband. In certain other aspects, the M non-anchor channels may be grouped into M carriers across a plurality of frames. In certain other aspects, each of the M carriers may occupy a set of adjacent non-anchor channels across in each of the plurality of frames. In certain other aspects, the at least one non-anchor hopping channel may include a single non-anchor hopping channel. In certain other aspects, each of the M carriers may be associated with a respective hopping sequence across a plurality of frames. In certain other aspects, the respective hopping sequence may include a fixed offset between contiguous non-anchor hopping channels in the M carrier. In certain other aspects, the respective hopping sequence may comprise a pseudo-random hopping sequence.

The reception component 1004 may be configured to send a signal associated with the FHP to the FHP component 1006 and/or the transmission component 1012. The FHP component 1006 may be configured to maintain information associated with the FHP.

In certain configurations, one or more of the reception component 1004 and/or the transmission component 1012 may be configured to communicate with the base station using the narrowband frequency hopping pattern.

In certain configurations, the reception component 1004 may be configured to communicate with the base station using the narrowband frequency hopping pattern by receiving a DRS in each of the plurality of anchor channels at a start of each hopping frame. The reception component 1004 may be configured to send a signal associated with the DRS to the DRS component 1008. The DRS component 1008 may be configured to maintain information associated the DRS and/or configured to perform cell acquisition based on the DRS.

The UL data component 1010 may be configured to generate UL data for the base station 1050. The UL data component 1010 may be configured to send a signal associated with the UL data to the transmission component 1012.

The transmission component 1012 may be configured to transmit the UL data to the base station 1050 using the FHP.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
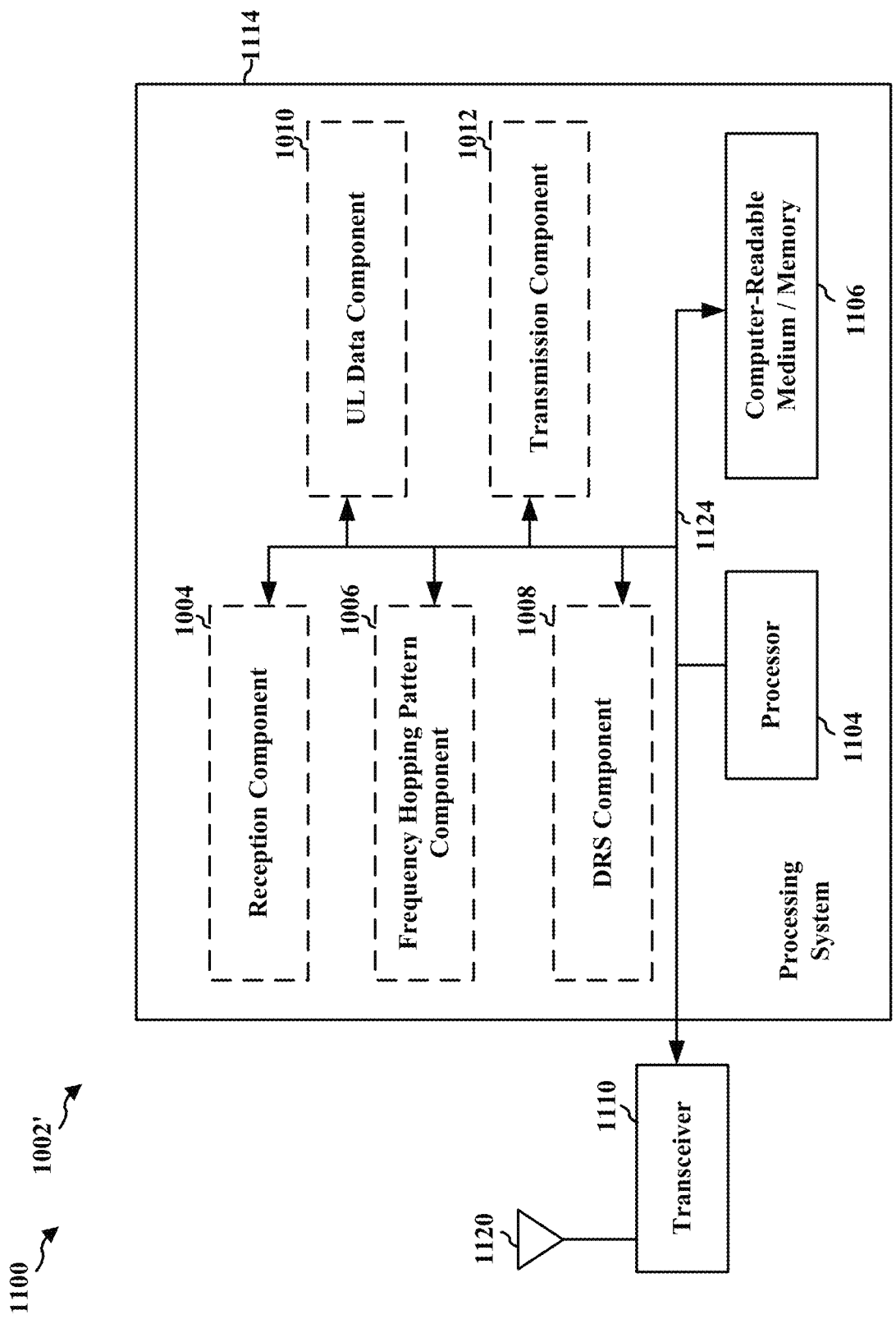
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In certain configurations, the apparatus 1002/1002' for wireless communication includes means for receiving information indicating a narrowband frequency hopping pattern from a base station. In certain aspects, the narrowband frequency hopping pattern may include a plurality of frames. In certain other aspects, each of the plurality of frames may include a plurality of anchor channels and at least one non-anchor channel. In certain aspects, the at least one non-anchor channel in each of the plurality of frames may include M non-anchor channels within a wideband. In certain other aspects, the M non-anchor channels may be grouped into M carriers across a plurality of frames. In certain other aspects, each of the M carriers may occupy a set of adjacent non-anchor channels in each of the plurality of frames. In certain other aspects, the at least one non-anchor hopping channel may include a single non-anchor hopping channel. In certain other aspects, each of the M carriers may be associated with a respective hopping sequence across a plurality of frames. In certain other aspects, the respective hopping sequence may include a fixed offset between contiguous non-anchor hopping channels in the M carrier. In certain other aspects, the respective hopping sequence may comprise a pseudo-random hopping sequence. In certain other configurations, the apparatus 1002/1002' for wireless communication may include means for communicating with the base station using the narrowband frequency hopping pattern. In certain aspects, the means for communicating with the base station using the narrowband frequency hopping pattern may be configured to receive a DRS in each of the plurality of anchor channels at a start of each hopping frame. In certain other configurations, the apparatus 1002/1002' for wireless communication may include means for transmitting UL data to the base station based on the frequency hopping pattern. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:

transmitting information indicating a narrowband frequency hopping pattern to at least one user equipment (UE), the narrowband frequency hopping pattern corresponding to a plurality of frames, the plurality of frames including at least one non-anchor channel and being associated with a plurality of anchor channels; and communicating with the at least one UE using the narrowband frequency hopping pattern including concurrently transmitting a discovery reference signal (DRS) in each of the plurality of anchor channels at a start of each hopping frame, wherein communication on the plurality of anchor channels occurs during the same frames, and wherein each DRS includes at least a primary synchronization signal (PSS) and a secondary synchronization signal (SSS) for a respective anchor channel.

2. The method of claim 1, wherein each DRS further includes a physical broadcast channel (PBCH) and a system information block (SIB).

3. The method of claim 1, wherein each anchor channel carries information indicating a hopping pattern on the at least one non-anchor channel for a corresponding anchor channel from the plurality of anchor channels.

4. The method of claim 1, wherein a single non-anchor channel is associated with the plurality of anchor channels.

5. The method of claim 1, wherein:
the at least one non-anchor channel in each of the plurality of frames includes M non-anchor channels within a wideband;
the M non-anchor channels are grouped into M carriers across the plurality of frames; and
each of the M carriers occupying a set of adjacent non-anchor channels in each of the plurality of frames.

6. The method of claim 5, wherein the communicating with the at least one UE using the narrowband frequency hopping pattern further comprises:
transmitting a plurality of downlink transmissions to one or more UEs, the plurality of downlink transmissions being transmitted concurrently in the M carriers.

7. The method of claim 6, wherein:
the one or more UEs include a single UE; and
the plurality of downlink transmissions include an initial downlink transmission transmitted on one of the M carriers and downlink retransmissions transmitted on a subset of the M carriers.

8. The method of claim 6, wherein the plurality of downlink transmissions includes a reservation signal on each of the M carriers when a data transmission is unavailable.

9. The method of claim 6, wherein the communicating with the at least one UE using the narrowband frequency hopping pattern further comprises:
receiving a plurality of uplink transmissions from the one or more UEs, the plurality of uplink transmissions being received concurrently in the M carriers.

10. The method of claim 9, wherein:
a first portion of each of the M carriers is allocated for downlink transmissions and a second portion of each of the M carriers is allocated for uplink transmissions; and
the second portion is located subsequent to the first portion in a time domain.

11. The method of claim 5, wherein:
each of the M carriers is associated with a respective hopping sequence across the plurality of frames; and
each respective hopping sequence includes a respective fixed offset from contiguous non-anchor channels in the M carrier.

12. The method of claim 11, wherein each respective hopping sequence comprises a pseudo-random hopping sequence.

13. The method of claim 5, wherein each of the M carriers have a same frame structure.

14. The method of claim 5, wherein a total bandwidth of each of the M carriers meets a bandwidth threshold criteria.

15. The method of claim 5, wherein the communicating with the at least one UE using the narrowband frequency hopping pattern comprises:
concurrently transmitting a first downlink transmission to a first UE in a first portion of each of the M carriers; and
concurrently transmitting a second downlink transmission to a second UE in a second portion of each of the M carriers, the second portion being subsequent to the first portion in a time domain.

16. The method of claim 15, wherein the communicating with the at least one UE using the narrowband frequency hopping pattern further comprises:
receiving a first uplink transmission in a third portion of a first carrier of the M carriers; and
receiving a second uplink transmission in the third portion of a second carrier of the M carriers, the first uplink transmission and the second uplink transmission being received concurrently, and the third portion being adjacent to the second portion in the time domain.

17. A method of wireless communication of a user equipment (UE), comprising:
receiving information indicating a narrowband frequency hopping pattern from a base station, the narrowband frequency hopping pattern corresponding to a plurality of frames, the plurality of frames including at least one non-anchor channel and being associated with a plurality of anchor channels; and
communicating with the base station using the narrowband frequency hopping pattern including receiving concurrent transmissions of a discovery reference signal (DRS) in each of the plurality of anchor channels at a start of each hopping frame, wherein communication on the plurality of anchor channels occurs during the same frames, and wherein each DRS includes at least a primary synchronization signal (PSS) and a secondary synchronization signal (SSS) for a respective anchor channel.

18. The method of claim 17, wherein each DRS further includes a physical broadcast channel (PBCH) and a system information block (SIB).

19. The method of claim 17, wherein each anchor channel carries information indicating a hopping pattern on the at least one non-anchor channel for a corresponding anchor channel from the plurality of anchor channels.

20. The method of claim 17, wherein a single non-anchor channel is associated with the plurality of anchor channels.

21. The method of claim 17, wherein:
the at least one non-anchor channel in each of the plurality of frames includes M non-anchor channels within a wideband;
the M non-anchor channels are grouped into M carriers across the plurality of frames; and
each of the M carriers occupying a set of adjacent non-anchor channels in each of the plurality of frames.

22. The method of claim 21, wherein:
each of the M carriers is associated with a respective hopping sequence across the plurality of frames; and
each respective hopping sequence includes a respective fixed offset from contiguous non-anchor channels in the M carrier.

23. The method of claim 22, wherein the respective hopping sequence comprises a pseudo-random hopping sequence.

24. An apparatus for wireless communication of a base station, comprising:

a memory; and at least one processor coupled to the memory and configured to:

transmit information indicating a narrowband frequency hopping pattern to at least one user equipment (UE), the narrowband frequency hopping pattern corresponding to a plurality of frames, the plurality of frames including at least one non-anchor channel and being associated with a plurality of anchor channels; and communicate with the at least one UE using the narrowband frequency hopping pattern including concurrently transmitting a discovery reference signal (DRS) in each of the plurality of anchor channels at a start of each hopping frame, wherein communication on the plurality of anchor channels occurs during the same frames, and wherein each DRS includes at least a primary synchronization signal (PSS) and a secondary synchronization signal (SSS) for a respective anchor channel.

25. The apparatus of claim 24, wherein each DRS further includes a physical broadcast channel (PBCH) and a system information block (SIB).

26. The apparatus of claim 24, wherein each anchor channel carries information indicating a hopping pattern on the at least one non-anchor channel for a corresponding anchor channel from the plurality of anchor channels.

27. The apparatus of claim 24, wherein a single non-anchor channel is associated with the plurality of anchor channels.

28. An apparatus for wireless communication of a user equipment (UE), comprising:

a memory; and at least one processor coupled to the memory and configured to:

receive information indicating a narrowband frequency hopping pattern from a base station, the narrowband frequency hopping pattern corresponding to a plurality of frames, the plurality of frames including at least one non-anchor channel and being associated with a plurality of anchor channels; and communicate with the base station using the narrowband frequency hopping pattern including receiving concurrent transmissions of a discovery reference signal (DRS) in each of the plurality of anchor channels at a start of each hopping frame, wherein communication on the plurality of anchor channels occurs during the same frames, and wherein each DRS includes at least a primary synchronization signal (PSS) and a secondary synchronization signal (SSS) for a respective anchor channel.

29. The apparatus of claim 28, wherein each DRS further includes a physical broadcast channel (PBCH) and a system information block (SIB).

30. The apparatus of claim 28, wherein a single non-anchor channel is associated with the plurality of anchor channels.

* * * * *